(12) United States Patent
Meriçli et al.

(10) Patent No.: US 12,154,436 B2
(45) Date of Patent: Nov. 26, 2024

(54) USER INTERFACES ADAPTED FOR SHARED CONTROL OF VEHICLES TRAVELLING IN FORMATION

(71) Applicant: Stack AV Co., Mount pleasant, PA (US)

(72) Inventors: Tekin Alp Meriçli, Pittsburgh, PA (US); Venkataramanan Rajagopalan, Sewickley, PA (US); Michael David George, Pittsburgh, PA (US); Cetin Alp Meriçli, Pittsburgh, PA (US); Alonzo James Kelly, Edgeworth, PA (US); Nezih Ergin Ozkucur, Pittsburgh, PA (US); Charles Brian Erny, Pittsburgh, PA (US); Craig Eugene Eyth, Ambridge, PA (US); Dennis Jeffrey Hoff, South Park Township, PA (US)

(73) Assignee: Stack AV Co., Mount Pleasant, PA (US)

(*) Notice: Subject to any disclaimer, the term of this patent is extended or adjusted under 35 U.S.C. 154(b) by 0 days.

(21) Appl. No.: 17/528,302

(22) Filed: Nov. 17, 2021

(65) Prior Publication Data
US 2022/0198937 A1 Jun. 23, 2022

Related U.S. Application Data

(63) Continuation of application No. 17/507,935, filed on Oct. 22, 2021, now Pat. No. 11,995,991.
(Continued)

(51) Int. Cl.
G08G 1/00 (2006.01)
B60R 1/06 (2006.01)
(Continued)

(52) U.S. Cl.
CPC ............ *G08G 1/22* (2013.01); *B60R 1/06* (2013.01); *B60R 1/12* (2013.01); *B60W 30/165* (2013.01);
(Continued)

(58) Field of Classification Search
CPC ........ G08G 1/00; B60R 1/00; B60R 2001/00; B60W 30/00; B60W 50/00;
(Continued)

(56) References Cited

U.S. PATENT DOCUMENTS

| 7,979,173 | B2* | 7/2011 | Breed | G08G 1/163 |
| | | | | 701/23 |
| 10,564,638 | B1* | 2/2020 | Lockwood | G05D 1/00 |

(Continued)

FOREIGN PATENT DOCUMENTS

| CA | 3127823 A1 | 7/2020 |
| EP | 3647134 A1 | 5/2020 |

(Continued)

OTHER PUBLICATIONS

Tanenbaum, Structured Computer Organization, 2007, Fifth Edition, pp. 109-110 (Year: 2007).*

(Continued)

*Primary Examiner* — Aniss Chad
*Assistant Examiner* — Elizabeth J Slowik
(74) *Attorney, Agent, or Firm* — Morrison & Foerster LLP

(57) ABSTRACT

Methods and apparatus for controlling two or more vehicles travelling in formation. Selected vehicles may be fully or partially autonomously controlled; at least one vehicle is partially controlled by a human driver. Information is collected at each vehicle and from the drivers and it is shared with other vehicles and drivers to create a shared world model. Aspects of the shared world model may be presented
(Continued)

to the human driver, who may then respond with a control input. Autonomy systems and the drivers on the vehicles then collaborate to make a collective decision to act or not to act and execute any such action in a coordinated manner.

14 Claims, 17 Drawing Sheets

Related U.S. Application Data

(60) Provisional application No. 63/128,961, filed on Dec. 22, 2020.

(51) Int. Cl.
| | | |
|---|---|---|
| *B60R 1/12* | (2006.01) | |
| *B60W 30/165* | (2020.01) | |
| *B60W 30/18* | (2012.01) | |
| *B60W 50/14* | (2020.01) | |
| *B60W 50/16* | (2020.01) | |
| *B62D 1/04* | (2006.01) | |
| *G05D 1/00* | (2024.01) | |
| *G05D 1/69* | (2024.01) | |

(52) U.S. Cl.
CPC ...... *B60W 30/18163* (2013.01); *B60W 50/16* (2013.01); *B62D 1/046* (2013.01); *G05D 1/0291* (2013.01); *G05D 1/69* (2024.01); *B60R 2001/1215* (2013.01); *B60W 2050/143* (2013.01); *B60W 2050/146* (2013.01); *B60W 2300/145* (2013.01); *B60W 2556/65* (2020.02)

(58) Field of Classification Search
CPC ......... B60W 2050/00; B60W 2300/00; B60W 2556/00; B60W 2540/00; B62D 1/00; B62D 15/00; G05D 1/00; G05D 2201/00
See application file for complete search history.

(56) References Cited

U.S. PATENT DOCUMENTS

| | | | | |
|---|---|---|---|---|
| 11,474,519 | B2* | 10/2022 | Hicok | G05D 1/0055 |
| 2010/0110523 | A1* | 5/2010 | Varaprasad | G02F 1/1525 |
| | | | | 359/273 |
| 2014/0346823 | A1 | 11/2014 | Stebbins et al. | |
| 2015/0015479 | A1 | 1/2015 | Cho | |
| 2016/0267796 | A1 | 9/2016 | Hiroma et al. | |
| 2017/0088143 | A1 | 3/2017 | Goldman-Shenhar et al. | |
| 2017/0192423 | A1* | 7/2017 | Rust | G05D 1/0238 |
| 2017/0277194 | A1* | 9/2017 | Frazzoli | G05D 1/0212 |
| 2017/0344023 | A1* | 11/2017 | Laubinger | G08G 1/22 |
| 2018/0107214 | A1 | 4/2018 | Chandy | |
| 2018/0136651 | A1* | 5/2018 | Levinson | B60W 30/00 |
| 2018/0211545 | A1 | 7/2018 | Smartt et al. | |
| 2018/0272944 | A1* | 9/2018 | Goncalves | H04N 23/90 |
| 2019/0086914 | A1 | 3/2019 | Yen et al. | |
| 2019/0132709 | A1 | 5/2019 | Graefe et al. | |
| 2019/0179341 | A1 | 6/2019 | Switkes et al. | |
| 2019/0191127 | A1 | 6/2019 | Koravadi | |
| 2019/0387060 | A1* | 12/2019 | Kentley-Klay | B60Q 1/503 |
| 2020/0039506 | A1* | 2/2020 | Woodbury | B60W 30/06 |
| 2020/0041994 | A1* | 2/2020 | Alalao | H04W 4/38 |
| 2020/0057453 | A1* | 2/2020 | Laws | B60W 30/18 |
| 2020/0156627 | A1 | 5/2020 | Wieschemann et al. | |
| 2020/0166361 | A1 | 5/2020 | Voznesensky et al. | |
| 2020/0189583 | A1 | 6/2020 | Tatourian | |
| 2020/0207371 | A1 | 7/2020 | Dougherty et al. | |
| 2020/0226857 | A1 | 7/2020 | Voznesensky et al. | |
| 2020/0240800 | A1 | 7/2020 | Voznesensky et al. | |
| 2020/0282990 | A1 | 9/2020 | Sato | |
| 2020/0342693 | A1* | 10/2020 | Jiang | G07C 5/008 |
| 2020/0402409 | A1 | 12/2020 | Shida et al. | |
| 2021/0024100 | A1 | 1/2021 | Calleija et al. | |
| 2021/0109544 | A1 | 4/2021 | Rakshit et al. | |
| 2021/0148715 | A1 | 5/2021 | Atanasiu et al. | |
| 2021/0181762 | A1* | 6/2021 | Zhao | G05D 1/0291 |
| 2021/0240201 | A1 | 8/2021 | Okuyama et al. | |
| 2021/0356965 | A1 | 11/2021 | Forster et al. | |
| 2022/0060870 | A1 | 2/2022 | Karl | |
| 2022/0108618 | A1 | 4/2022 | Kumar et al. | |
| 2022/0126878 | A1* | 4/2022 | Moustafa | B60W 50/0098 |
| 2022/0155082 | A1 | 5/2022 | Toshniwal | |
| 2022/0161816 | A1* | 5/2022 | Gyllenhammar | G06V 20/56 |
| 2022/0189307 | A1* | 6/2022 | Shmueli Friedland | |
| | | | | G08G 1/166 |
| 2022/0198936 | A1 | 6/2022 | Meriçli et al. | |
| 2023/0242161 | A1 | 8/2023 | Sprang et al. | |

FOREIGN PATENT DOCUMENTS

| | | |
|---|---|---|
| WO | 2017/040689 A1 | 3/2017 |
| WO | 2020/205597 A1 | 10/2020 |
| WO | 2020252227 A1 | 12/2020 |

OTHER PUBLICATIONS

International Search Report and Written Opinion Dated Mar. 18, 2022 for Related PCT/US21/63447.
"Practical Autonomous Trucking For Today". locomation.ai, Nov. 28, 2020, retrieved on Feb. 19, 2022. Retrieved from URL: https://web.archive.org/web/20201128145637/https://locomation.ai/.
Dey, et al., "Distance-Dependent eHMIs for the Interaction Between Automated Vehicles and Pedestrians," AutomotiveUI '20: 12th International Conference on Automotive User Interfaces and Interactive Vehicular Applications, Sep. 2020 pp. 192-204; Retrieved from URL:https://doi.org/10.1145/3409120.3410642.
Fong, T. (Nov. 2001). "Collaborative Control: A Robot-Centric Model for Vehicle Teleoperation," The Robotics Institute, Carnegie Mellon University (CMU-RI-TR-01-34); 198 pages.
Huang et al. (Mar. 2009). "Finding Multiple Lanes in Urban Road Networks with Vision and Lidar," Autonomous Robots, 26: 103-122.
Meriçli et al., U.S. Office Action mailed Apr. 5, 2023, directed to U.S. Appl. No. 17/507,935; 25 pages.
Meriçli et al., U.S. Office Action mailed Sep. 19, 2023, directed to U.S. Appl. No. 17/507,935; 17 pages.
Sprang et al., U.S. Office Action dated Jun. 8, 2023, directed to U.S. Appl. No. 17/588,689; 14 pages.
Triller. (Jan. 2009). "A Cooperative Behaviour Model for Autonomous Robots in Dynamic Domains," University of Kassel; pp. 1-107.
Tsugawa et al. (Mar. 2016). "A Review of Truck Platooning Projects for Energy Savings," IEEE Transactions on Intelligent Vehicles 1(1): pp. 68-77.

* cited by examiner

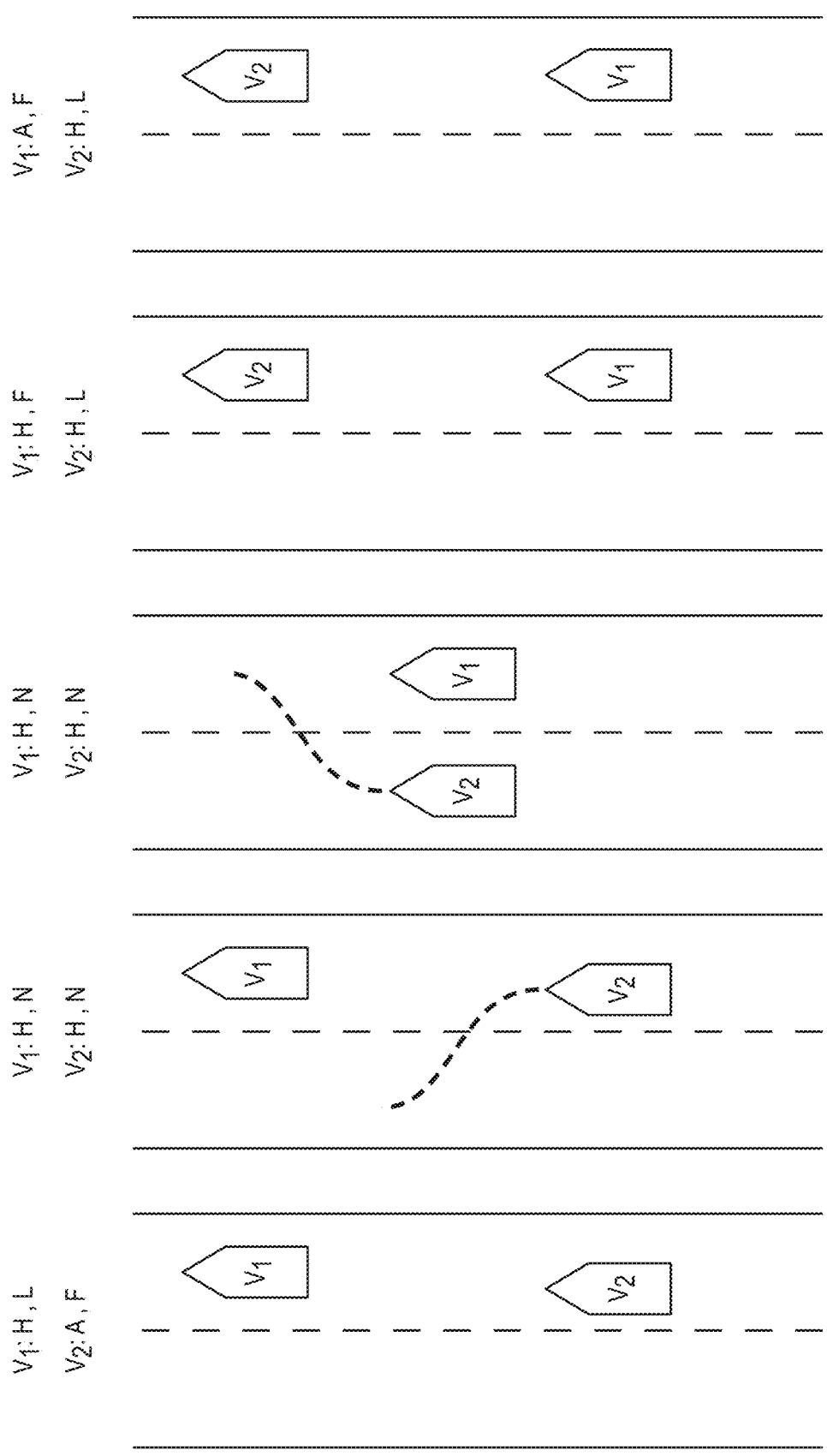

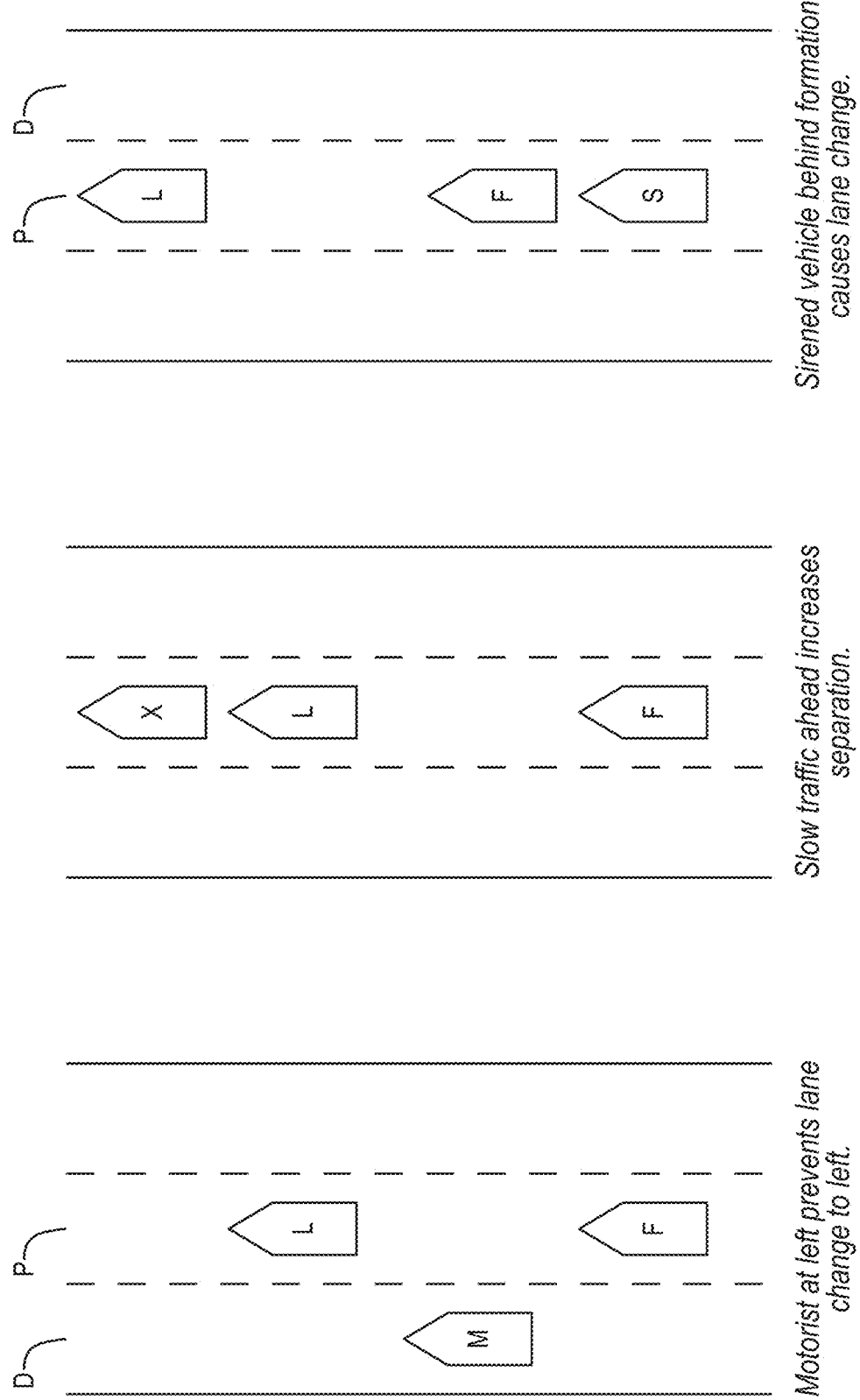

SYNTHETIC OVERHEAD VIEWPOINT
ON-RAMP AND MERGE WITH TRAFFIC

SYNTHETIC OVERHEAD VIEWPOINT
EXIT-RAMP AND SPLIT WITH TRAFFIC

USER INTERFACES ADAPTED FOR SHARED CONTROL OF VEHICLES TRAVELLING IN FORMATION

REFERENCE TO RELATED APPLICATIONS

This patent application claims priority to a U.S. Provisional Application Ser. No. 63/128,961 filed Dec. 22, 2020 entitled "Shared Control for Vehicles Travelling in Formation", pending U.S. patent application Ser. No. 17/507,935 filed Oct. 22, 2021 entitled "Shared Control for Vehicles Travelling in Formation", the entire contents of each of which are hereby incorporated by reference.

TECHNICAL FIELD

This application relates to autonomous vehicles and more particularly to shared control of two or more vehicles travelling in formation.

BACKGROUND OF THE INVENTION

Certain efforts in the field of robotics in the past several decades have focused on providing autonomous control over one vehicle when it is following another. Ideally, an autonomous follower vehicle should act in the same way as if it were driven by a human, observing all traffic laws and always behaving in a predictable manner. The general goals of automated driving include increased safety, reduced congestion, and reduced emissions.

As applied to commercial vehicles, such as long-haul trucking, the goals also involve energy saving and personnel cost reduction. Methods have thus been developed for operating groups of trucks along the same trajectory with only a short gap in between. Such so-called platoons or convoys may use cooperative control. They may make driving decisions by combining information from forward-looking remote sensors that measure, for example the distance and speed difference to the immediately preceding truck, with additional information communicated from that truck and other trucks ahead of it. See, for example, Tsugawa, et al. "A Review of Truck Platooning Projects for Energy Savings", IEEE Transactions on Intelligent Vehicles, Vol. 1 No. 1, March 2016, pp 68-77 for a review of several such prior efforts.

Aspects of vehicle control that involve following travel lanes have also been studied for decades. For example, Huang, et al., in "Finding multiple lanes in urban road networks with vision and lidar", Autonomous Robots, Vol 26, pp. 103-122 (2009) describes a system for detecting and estimating the properties of multiple travel lanes in an urban road network from calibrated video imagery and laser range data acquired by a moving vehicle. The system operates in real-time on multiple processors, fusing detected road markings, obstacles, and curbs into a stable estimate of nearby travel lanes that can be used to guide a vehicle.

Fong, T. in "Collaborative Control: A Robot-Centric Model for Vehicle Teleoperation", The Robotics Institute, Carnegie Mellon University (2001) (CMU-RI-TR-01-34) describes a collaborative control approach, where a human and a robot collaborate to perform tasks and to achieve common goals. Instead of a supervisor dictating to a subordinate, the human and the robot engage in dialogue to exchange information, to ask questions, and to resolve differences. With this approach, the robot has more freedom in execution and is more likely to find good solutions when there are problems. The human is able to function as a resource for the robot, providing assistance with cognition and perception during task execution. This can enable the human to compensate for inadequacies of autonomy.

Triller, S., in "A Cooperative Behaviour Model for Autonomous Robots in Dynamic Domains", University of Kassel, (2009) describes scenarios where cooperative teams of autonomous robots are used in various domains such as a robot soccer game. Multiple robots form a team; every robot integrates its sensor data into its own world model. Certain data from this world model is sent to other team members. Whenever a robot receives data from one of its team members, it integrates that data into its own copy of a shared world model. The shared world model holds data for every team member and offers methods such as calculating a shared ball position. A Behaviour Engine on each robot can take the shared data into account to coordinate their actions. Data such as the ball position can be further fused, for example, to calculate a shared estimate of the ball position. For example, the shared estimated ball position may represent the position of the ball that most robots agree on.

SUMMARY OF THE INVENTION

Disclosed herein are systems and methods for shared control of autonomous platoon vehicles wherein a first vehicle is at least partially controllable by a human driver and a second vehicle is controllable by autonomy logic. In order to improve the operation of the platoon, it can be advantageous for the autonomy logic on one or both vehicles to collaborate with each other and with the human driver.

Such collaboration may be enabled by the sharing of information, where such information may ultimately be used for numerous tasks including:

Perceive: understanding objects and events external and internal to the platoon

Think: arriving at decisions to act or not to act based on overall awareness of the situation Act: executing or not executing actions Methods and apparatus are described to enable platooning vehicles to collaborate using such shared information including the case of vehicles intending to enter or leave the platoon, or to change lanes, or to take other actions. Methods are also provided to convey and accept information so as to assist human drivers who participate in this collaboration.

While it is not uncommon for vehicles moving in formation to share information, the use and maintenance of a shared world model can be more elaborate in practice than simply sending commands and sensor data between vehicles. While commands and sensor data can be part of the information being shared, other information could include any information produced in any intermediate stage of processing or interfacing to humans. In part, the benefit of exposing such intermediate stage information is that it allows much deeper collaboration in the interpretation of the environment, and in making complicated decisions.

Such more elaborate sharing can enable and/or improve collaborative control including any collaborative behaviors for any number of autonomously controllable vehicles. Furthermore, the collaborative activities can involve any number of humans and the autonomy logic on any number of vehicles both of which can be distributed arbitrarily among those vehicles.

In one aspect, a method or system provides collaborative control of a platoon of vehicles. A first vehicle is at least partially controllable by a human driver and a second vehicle is at least partially controllable by autonomy logic. Information is collected from human driver inputs and outputs on at least the first vehicle. Information is also collected from sensors on both the first and second vehicles. The resulting collected information is then shared between the first and second vehicles. Each vehicle then uses the shared information to maintain its own copy of a shared world model. The shared world model then enables the vehicles to collaboratively engage in one or more actions as a unit. More particularly, a decision to perform or not perform a proposed action results from collaboration between the human driver and the autonomy logic, such that an action proposed by the autonomy logic can be vetoed by the human driver and such that an action proposed by the human driver can be vetoed by the autonomy logic.

In some embodiments, the actions supported by the shared world model may include the human-controlled vehicle joining or leaving the platoon.

In some embodiments, the actions supported by the shared world model may include a second human-controlled vehicle joining the platoon behind the first human-controlled vehicle with the second vehicle then entering an autonomous driving mode. Or the actions may include the human-controlled vehicle leaving an autonomous driving mode and entering a human-controlled mode and exiting the platoon.

The collaborative actions supported by the shared world model may also include swapping the roles of a leader vehicle and a follower vehicle, with corresponding change of driving mode from autonomy or human-driven and vice-versa.

Other collaborative actions supported by the shared world model are possible, such as either the first or second vehicle changing lanes; or either the first or second vehicle entering or leaving a travel lane; or a vehicle entering a highway via a traffic ramp or shoulder; or either the first or second vehicle increasing or decreasing speed or distance to another vehicle.

The human driver inputs and outputs provided to or obtained from the shared world model may include information conveyed visually, via audio (recognizable sounds or spoken words), or physically such as by forces on a joystick, or steering wheel or other manual input device.

The collaborative decision process may further consider propagation of constraints imposed on either the first vehicle or the second vehicle, or both, prior to some collaborative action being taken. Such constraints may include the autonomy logic discouraging but not preventing the human from making a steering decision.

The information maintained in the shared world model may include information such as data originating outside the components of the autonomy logic or human control and derived data; or data originating inside the autonomy logic or human control; and/or physical phenomena that is capable of being sensed by the human driver.

Also described herein is an interface for enabling collaborative control of a platoon of vehicles where a first vehicle is at least partially controllable by a human driver and a second vehicle is at least partially controllable by autonomy logic. The interface is for collecting information from human driver inputs and outputs on the first vehicle; and collecting information from sensors on both the first and second vehicles. The resulting collected information is then shared between the first and second vehicles to maintain a shared world model. The interface displays at least a selected portion of the resulting shared information on a display associated with the first vehicle, such that the world model enables the vehicles to collaboratively engage in a decision as a unit.

In some example embodiments, the interface displays convey information to a human driver such as whether or not an action proposed by the human driver has been vetoed by the autonomy logic.

The interface displays may also communicate to the driver some aspect of the platoon's ability to safely execute a maneuver as a unit, as derived from state information in the shared world model. Such maneuvers may include highway entrances, highway exits, or lane changes.

Information can also be conveyed physically to a human driver, via haptic feedback, such as through a steering wheel or seat.

BRIEF DESCRIPTION OF THE DRAWINGS

Additional novel features and advantages of the approaches discussed herein are evident from the text that follows and the accompanying drawings, where:

FIGS. 6A through 6E depict a scenario where leader and follower vehicles are swapping roles and stations.

FIGS. 7A through 7C show some examples of collaboration to react to various traffic situations.

DETAILED DESCRIPTION

This patent application describes methods for shared control of vehicles moving in formation. The description will focus on examples where a pair of vehicles are in the formation, with a first vehicle being at least partially controllable by a human driver and a second vehicle being controllable by autonomy logic. However it should be understood that the principles discussed herein are applicable to larger groups of vehicles.

When vehicles desire to move in formation, each may have access to information that others may not. The information available in any vehicle might originate in or near the vehicle and be sensed using sensors on that vehicle. The physical phenomena being sensed might be too far away from other vehicles to sense (either well or at all) or the phenomena may be occluded by the one vehicle able to sense it. Information may also originate from a human inside any vehicle whose presence is unknown or undetectable in other vehicles. When humans are the intended consumer of information it often is best formatted in a manner consistent with human sensory capacities. Information could also be the result of arbitrary amounts of processing of any other information that was available as inputs to such processing.

When a number of vehicles desire to act as a unit, they will often need to think as a unit, and this can be difficult to achieve when all of the relevant information is distributed across space—meaning among the vehicles themselves. One possible solution is to share relevant information among the vehicles. The approach does not rely on particular signal processing, simulation, sensor data fusion, or optimal estimation schemes, but rather in the methods to interpolate, extrapolate, deconflict, filter, process and share such information as part of collaborative decision making. A shared database produced using such techniques can be more complete, up-to-date, consistent, and accurate than it might be otherwise and this database can be made available on every vehicle.

Methods are presented herein to share information in order to enable and/or improve the manner in which a number of vehicles may operate in formation as a unit. Individual vehicles may be operated by humans, by autonomy logic, or by a combination of both. For example, autonomy logic may be used to offload humans, cognitively or otherwise, to allow the human(s) to focus attention elsewhere or relieve them from the need to communicate with vehicles in sufficiently quantitative or precise terms.

Furthermore, some methods may use information being shared between all of the humans and all of the autonomy logic on all of the vehicles in order to enable the entire formation to operate more effectively as a unit.

1.1 Information Flows

Figure 1:
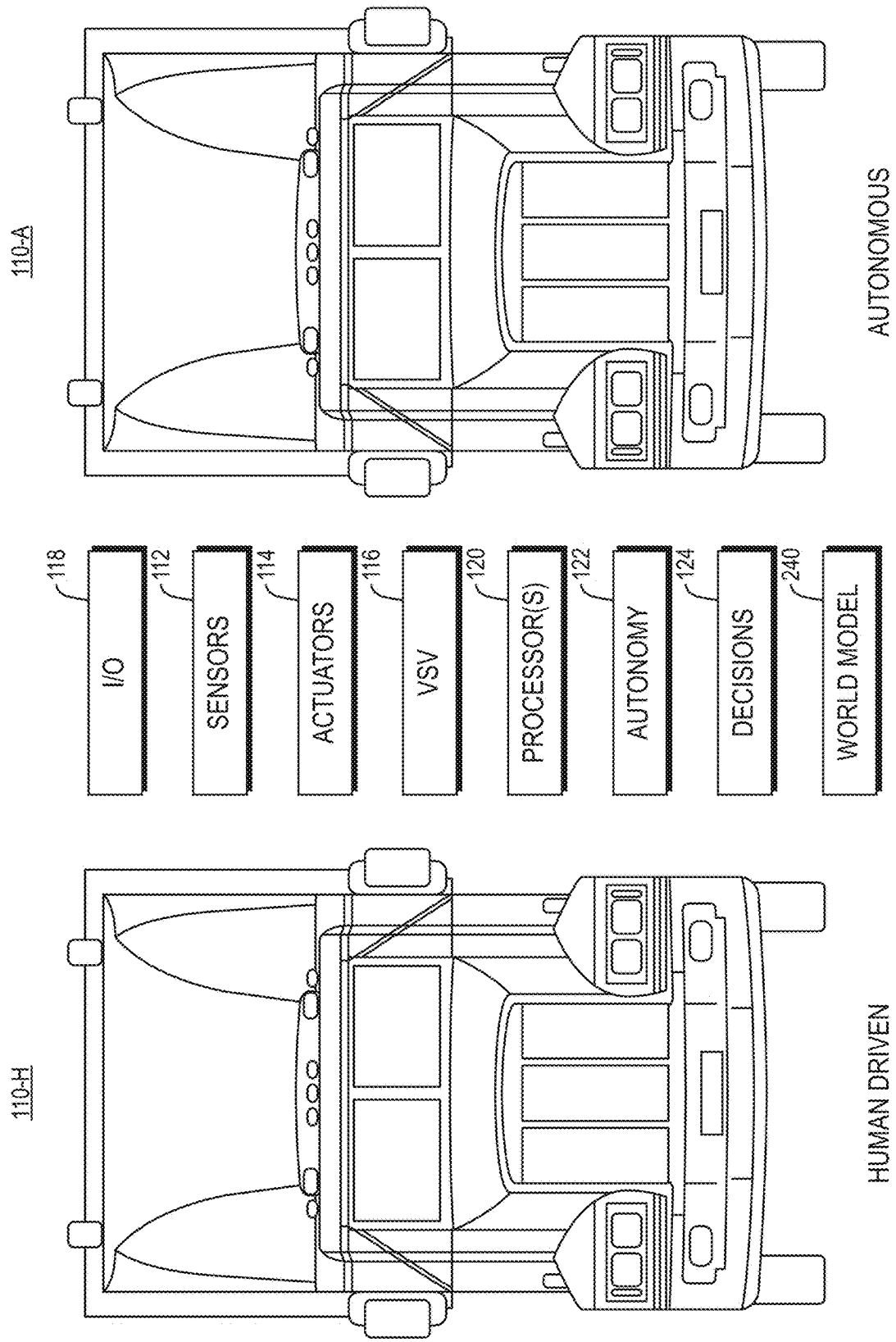
FIG. 1 is a drawing showing an autonomous and a human-driven truck and some of the hardware and software systems that enable collaboration.

FIG. 1 is a situation where two vehicles are cooperatively travelling as a unit. Both vehicles may incorporate, either when the vehicle is manufactured or in a subsequent retrofit, hardware and software that enables them to implement autonomy logic. Such autonomy logic may include algorithms to enable vehicles to drive themselves, to interact with human drivers, and to exchange information between themselves.

An example vehicle 110 may include sensors 112, actuators 114, V2V radio transceivers 116, other I/O devices 118, and one or more processors 120 (also referred to herein as controllers 120). As discussed further herein, the one or more processors 120 may execute various logic including autonomy logic 122, decision logic 124 and may also maintain a world model 240. Vehicles 110 include human-driven vehicles 110-H and autonomous vehicles 110-A.

Figure 2:
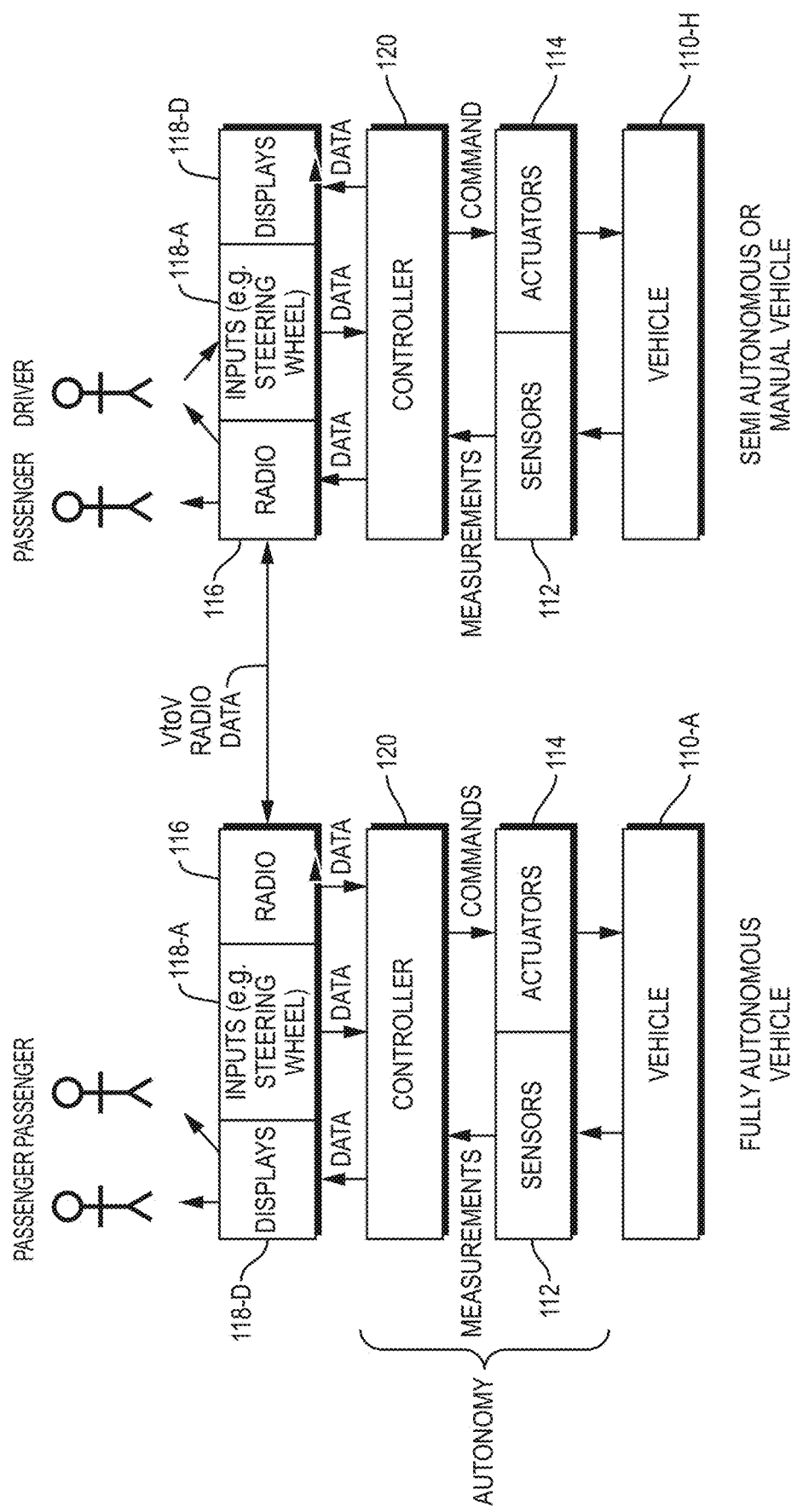
FIG. 2 is an architecture block diagram that shows the equipment that connects the controllers on two vehicles to the driver(s), sensors, actuators, and to the other vehicle.

FIG. 2 illustrates these components in more detail. Self-driving algorithms and other aspects of the autonomy logic 122 are implemented in a controller (such as one or more processors 120) that receives sensor 112 data from the respective vehicle (110-A or 110-H) and sends actuator 114 signals to the respective vehicle 110-A or 110-H. The controller 120 may further implement human interface algorithms that accept inputs 118-A (e.g., steering, throttle, touch screen etc.) via other I/O devices 118-D from human drivers while also sending data to other I/O devices 118 such as human-readable displays. The controller 120 may also send data to and accept data from vehicle-to-vehicle (V2V) radio transceiver(s) 116 to allow it to interact with humans and exchange information with the controllers 120 located in other vehicles 110.

1.2. Collaboration via Shared Information

Figure 3:
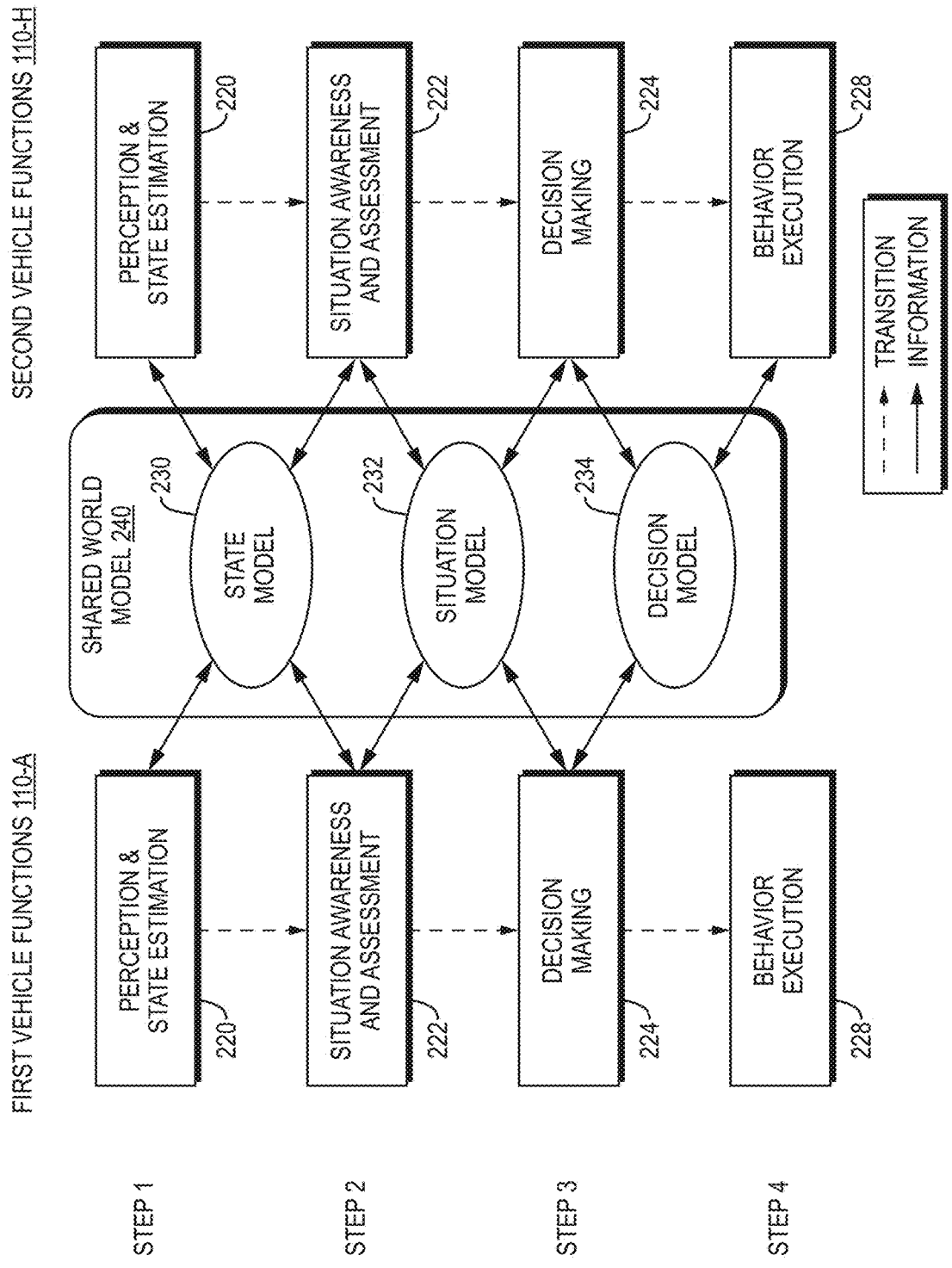
FIG. 3 is a flowchart and data flow diagram representing the process steps and information flows that enable collaboration.

As shown in FIG. 3, functions that provide decision logic 124 for each vehicle 110-A, 110-H may include perception and state estimation 220, situation awareness and assessment 222, decision making 224, and behavior execution 228. The world model 240 may include a state model 230, situation model 232 and decision model 234.

The controller 120 may implement algorithms that enable driver(s) and vehicles to collaborate based on the shared information. This information typically includes sensor data originating outside the components of the computer/human system as well as derived data (states, events, constraints, conclusions) originating inside the computer/human system and data indicative of physical phenomena created by human drivers or for the purpose of being sensed by human drivers. The shared information may therefore include data that (i) originates within or outside the convoy, (ii) represents physical phenomena (such phenomena produced by or capable of being sensed by humans, such as forces on steering wheels), (iii) is received from sensors or other input devices in its raw/sensed form or (iv) is derived data (examples include states, events, constraints, conclusions, originating inside the components of autonomy logic or human control).

Each vehicle 110 will have its own local copy of such shared information referred to herein as a shared world model 240. At any given instant, each local copy of the shared world model 240 may not be entirely consistent with the local copy on other vehicles. Nevertheless, processes residing on all controllers 120 for all vehicles 110 attempt to keep the shared information in the shared world model 240 and local copies sufficiently up-to-date and consistent to permit effective collaboration. Propagation of the local copy of the shared world model 240 among vehicles 110 is discussed in more detail below.

1.3. Information Processing Steps

In FIG. 3, the rectangular boxes on both left and right sides indicate an example sequence called a perceive-think-act sequence. The dotted lines represent transitions between those steps and the solid lines represent data flows between each process and components of the shared world model. As data that originates inside the computer/human system, the world model 126 (and hence also the shared world model 240) acts as another source of information to be used by the autonomy algorithms implemented in the controller 120.

The perception and state estimation step 220 may process all of the information incoming from all sources in order to derive substantially new information that describes arbitrary attributes of the vehicles, humans, and external objects and traffic, etc. Such processing may comprise operations such as, for example:

state estimation/data fusion-reducing redundant information to non-redundant form or combining relevant quantities to produce other relevant quantities (e.g. measuring space between the vehicles)

prediction-deriving later state from earlier state and a measurement (or prediction) of time (e.g. predicting time to collision based on last known speed)

The situation awareness and assessment step 222 may process all of the information incoming from all sources in order to derive substantially new information that is less directly related to sensed and communicated information, for example:

detecting events—watching and noticing when something important occurs (e.g. car in blind spot)

constraint propagation—deriving constraints from other information (e.g. do not change lanes now)

The decision making step 224 may process all of the information incoming from all sources in order to derive substantially new information that is associated with or comprises decision making, for example:

logic—deriving conclusions from other information, typically by the processes of logical inference, deduction, resolution etc. (e.g. proposed lane change is rejected due to incoming veto)

deliberation—weighing numerous alternatives in order to choose one of them (e.g. first vehicle cannot speed up so second vehicle should slow down)

The behavior execution step 228 may process all of the information incoming from all sources in order to derive substantially new information that is associated with or causes acting in the real world, for example:

notification—creating events (e.g. messages) for consumption in another part of the system (e.g. lane change maneuver commencing now)

action—maintaining or altering the motion of the vehicle (e.g. execution of emergency braking maneuver.

1.4. Shared World Model

In FIG. 3, the ellipses 230, 232, 234 indicate some components of the shared world model 240. The shared world model 240 is used as a diverse data repository that is both the source of relevant information for some algorithms, and the repository for results for other (or the same) algorithms. In general, any processing step may read information from or write information to any component. As mentioned above, each vehicle has its own local copy of the shared world model 240 and processes attempt to keep them somewhat up-to-date and consistent. In this way, processes on any one vehicle are effectively reading and writing information to the shared world models of all vehicles.

The shared world model 240 comprises all information that is shared. In FIG. 3, it was depicted as being divided into three components 230, 232, 234 for convenience of explanation but there can be more or fewer components (such as state prediction 221 described below) and the distinctions between only serve to help elaborate the different ways in which vehicles may collaborate. In an example embodiment, the shared information contains:

State model—information that relates to the properties, attributes, etc. of all objects of interest, both internal and external to the vehicle formation. For example, this component comprises aspects of "where everything is and how it is moving".

Situation model—information that relates to description of the situation. For example, this component comprises aspects of "what is happening".

Decision model—information that relates to decisions to taking or not taking actions. For example, this component comprises aspects of "what to do".

Figure 4:
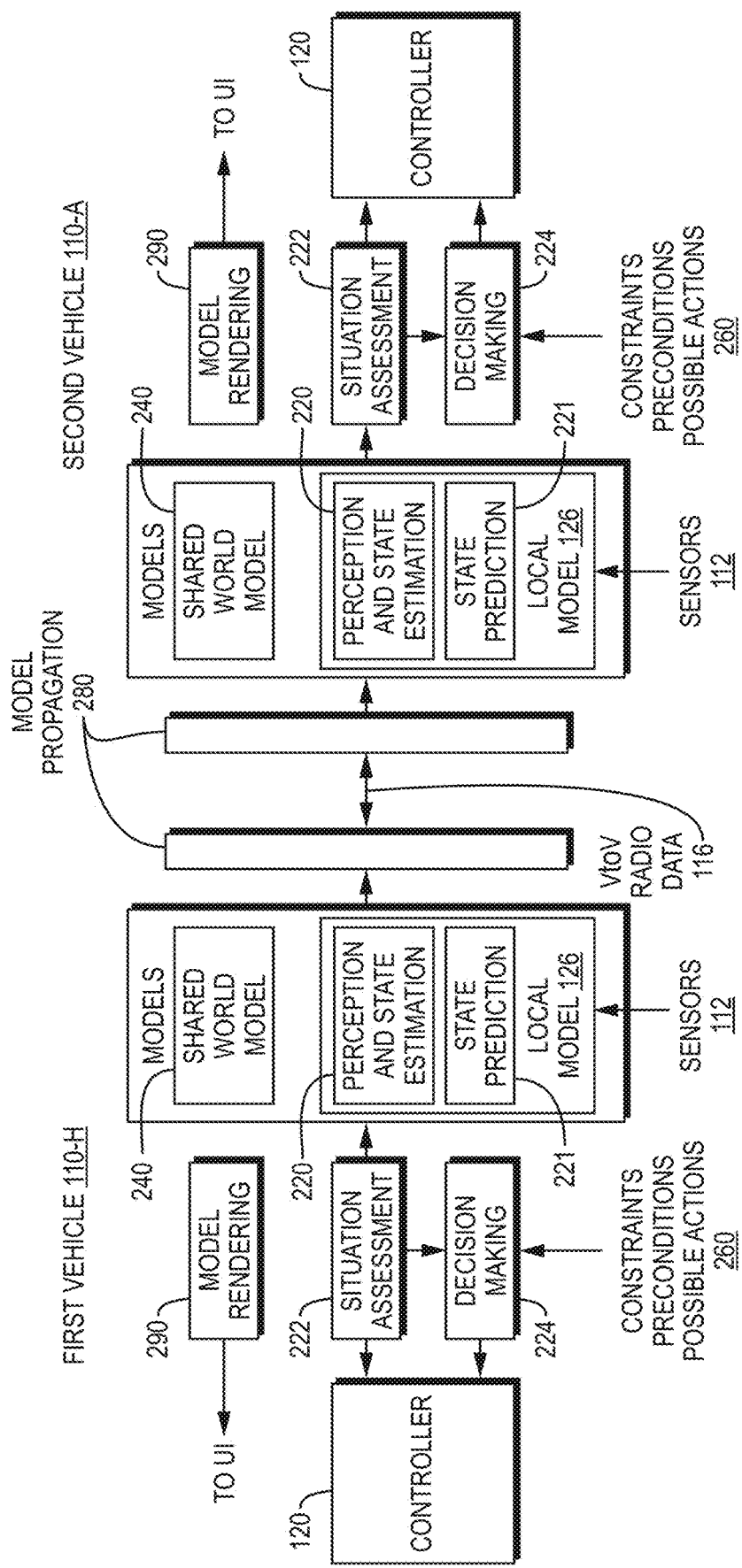
FIG. 4 is a data flow diagram that shows some major components of the autonomy controller and their data interconnections.

As depicted in the example data flow diagram of FIG. 4, each vehicle 110-H or 110-A has a controller 120, local model 126, perception and state estimation 220, state prediction 221, situation assessment 222, decision making 224, shared world model 240, model propagation 280, model rendering 290, and vehicle to vehicle communication components. Sensors 112 feed the perception and state estimation 220 and state prediction 221 components that make up the local model 126. The content of the local model 126 is used to develop the local copy of the shared world model 240 which is in turn shared with other vehicles 110 via the model propagation function 280. Constraints, preconditions and possible actions 260 are input to decision making 224 along with outputs from situation assessment 222, which in turn drive the controller 120. Model rendering 290 feeds a user interface.

2. Collaborative Behaviors Enabled by Shared Information

Given the context of shared information stored in a shared world model 240, this section describes how such information can be used to implement numerous examples of shared control and collaborative behaviors. Shared control refers to a case where the controllers on two or more vehicles work together, (i.e. collaborate) in some manner to control themselves. For example, a lead vehicle may speed up or a follower may slow down, or both, in order to increase the space between the vehicles. The term collaborative behavior is often used in the art to refer to actions that are more complicated than basic control because they are characterized by multiple steps, transitions between states, etc. Shared control is a simple case of a collaborative behavior.

2.1. Entering and Leaving a Platoon

Figure 5C:
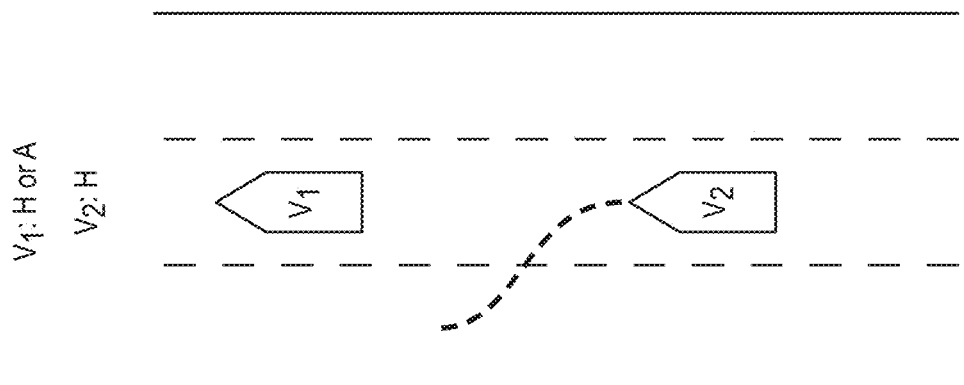
FIGS. 5A through 5C depict a scenario where vehicles are entering and leaving a platoon.
Figure 5B:
Figure 5A:
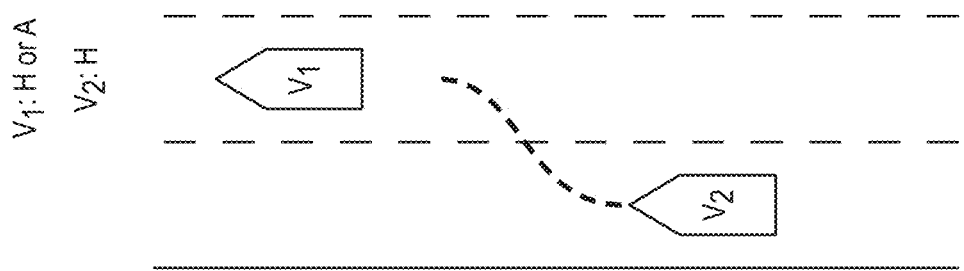

FIGS. 5A through 5C show a scenario where information is shared between two vehicles commencing and ceasing to operate in an in-line leader-follower formation, often called a platoon.

In FIG. 5A, a first vehicle (vehicle 1, denoted by V1) is travelling in a center lane of a three lane divided highway. Vehicle 1 may be under control of a human driver or under control of autonomy logic. This is indicated by the status "V1: H or A" above the graphic depiction of the highway.

A second vehicle, vehicle 2 is initially driven by a human and is denoted V2 and has status V2: H. The human driver of vehicle 2 changes lanes as necessary and when convenient but in any case maneuvers to position vehicle 2 behind vehicle 1 at an appropriate distance and relative speed to initiate the process of transferring control authority to autonomy logic. That process may be initiated via a request from V2 to V1.

The transfer of control of V2 to autonomy mode is a collaborative behavior. To enable this collaborative behavior, the shared world model 240 includes the aforementioned distance and relative speed information for the vehicles as well as information about a request to the lead vehicle (here, a request from V2 to V1) to join with it in a platoon in autonomy mode. That request is processed to assess compliance with pre-conditions on the transition of one or both vehicles into automated platooning mode. Some or all of the information needed to assess pre-conditions may be provided in the shared world model 240 itself. For example, information related to the state of buttons, switches and displays used by humans in their respective vehicles may be stored in the world model 240. The preconditions may also be used to orchestrate a deliberate handshaking maneuver where a request issued by a human in one of the vehicles is ultimately processed and perhaps accepted by a human in the other vehicle. The result is that a decision to join the platoon is a collaborative one, involving decisions by the operators, and optionally, the particular autonomy logic of both vehicle 1 and vehicle 2, and is based on the preconditions as presented in the shared world model 240.

In FIG. 5B, the transition into automated platooning mode is complete and vehicle 2 is now in autonomy mode (as indicated by V2: A). Vehicle 1 remains in its prior state (as indicated by V1: H or A). Information related to the maintenance of this vehicle platoon formation including execution of numerous collaborative behaviors is described below.

In FIG. 5C, the situation is a transition out of autonomous platooning mode. The human present in vehicle 2 may have assumed control of the vehicle unilaterally in response to an emergency, or by participating in a more gradual and deliberate handshaking maneuver in collaboration with vehicle 1 and its human driver. In either case, information related to the state of motion of each vehicle, progress in the multi-step process to transition control authority, descriptions of any objects or vehicles in the vicinity etc. may be represented in the shared world model 240.

The decision to transition out of the platoon is, as before, a collaborative one that deliberately requires involvement/ decision making by both V1 and V2 based on information in the shared world model 240. Once the transition to human control of vehicle 2 is complete, its human driver may subsequently direct the vehicle arbitrarily and without collaboration from vehicle 1, as indicated by the state V2: H. Such a maneuver may include changing into the left lane and increasing speed to pass V1 as shown in this example.

Figure 5D:
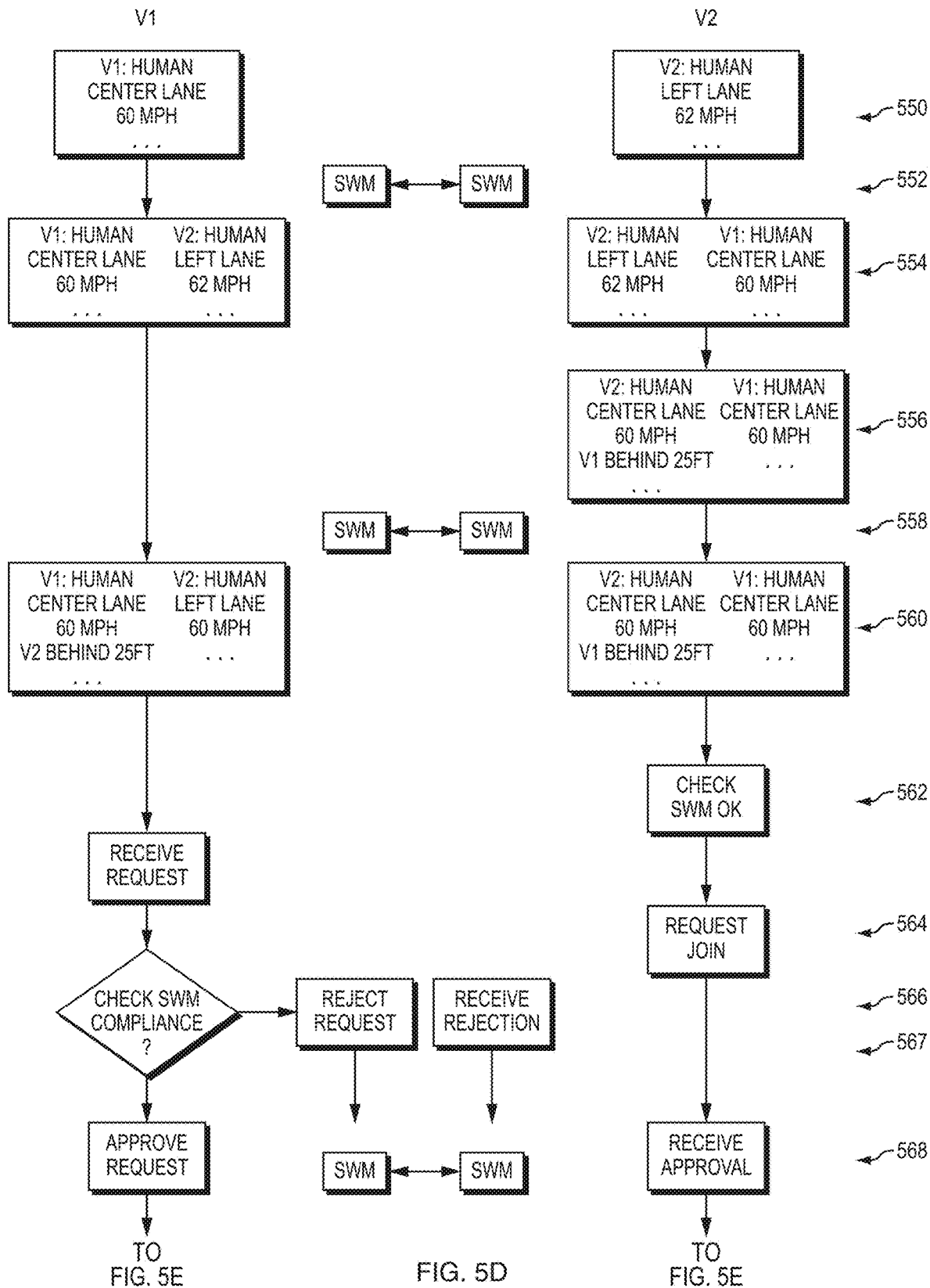
FIGS. 5D and 5E are a process flow for the scenarios in FIGS. 5A through 5C.
Figure 5E:
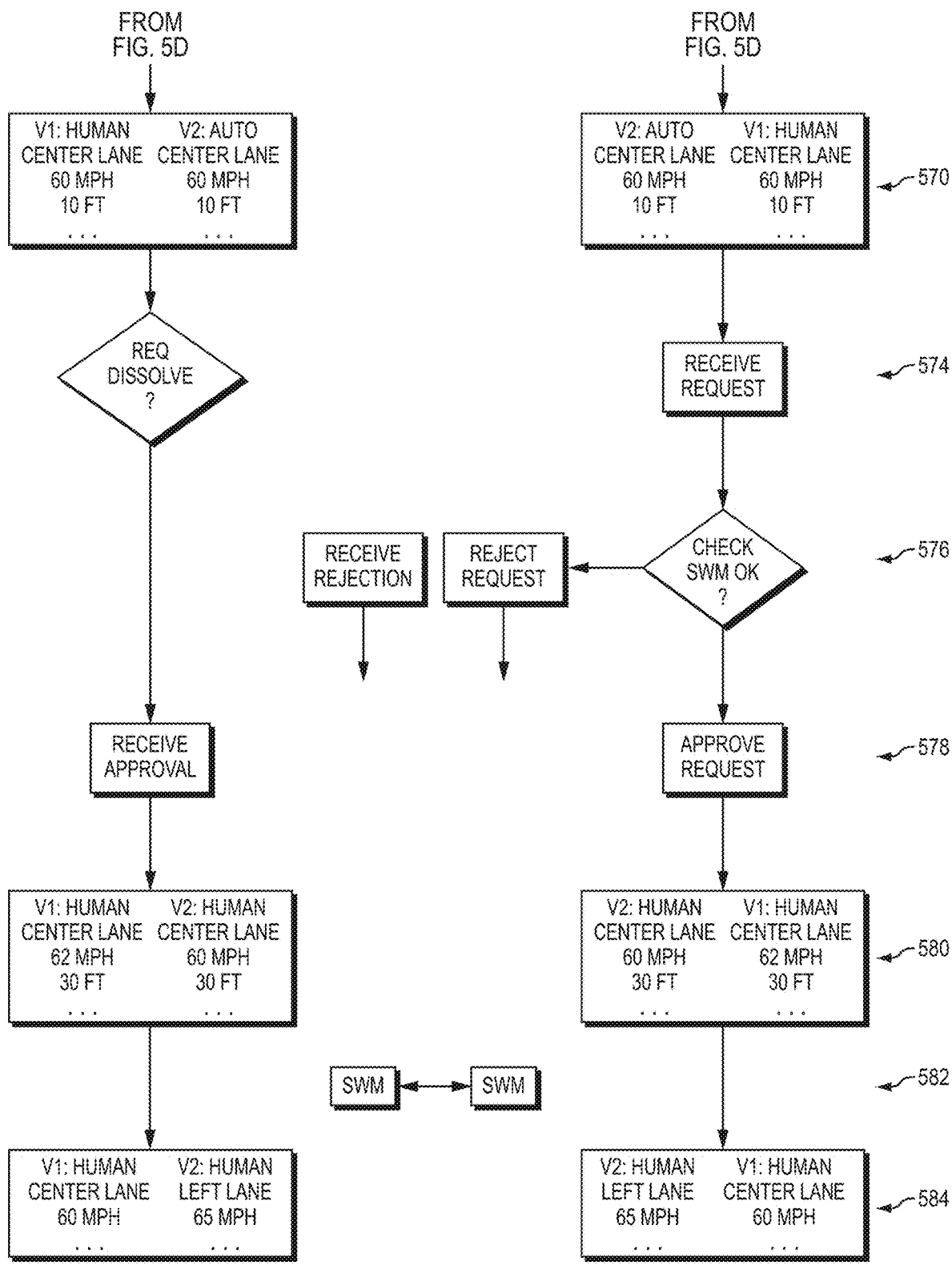

FIGS. 5D and 5E are logical flow diagrams illustrating how the continuously updating shared world model may be used in collaborative decision making for the platoon enter and leave scenario depicted in FIGS. 5A-5C.

In this example, in an initial state 550 vehicle V1 is maintaining a version of the world model that indicates itself is human driven, located in the center lane and traveling at 60 MPH. In this initial state 550, V2 is out of range and the model maintained by V1 has no knowledge of vehicle V2. Similarly, in this state 550 vehicle V2 is aware from its own sensors that it is human driven, located in a left lane and traveling at 62 mph, but has no knowledge of V1.

Eventually, a state 552 is reached in which the two vehicles are within a communication range of one another and vehicle V2 announces itself, perhaps as directed by its human driver, and a communications link (V2V) is established. Here they will update their shared world model such that in state 554 they have a consistent "picture" of one another's state. For example the shared world model 240 in each vehicle is now "aware" that V2 now knows that V1 is human driven, in the center lane and traveling at 60 MPH, and that V2 is in the left lane human driven and traveling at 62 MPH (as was depicted in FIG. 5A).

In state 556, the human in control of V2 wishes to platoon with V1 and enter an autonomy mode. However before V2 is enabled to do that a number of steps must first occur. In state 556, vehicle V2 has assumed the position shown in FIG. 5B where it is now traveling in the center lane, attempting to match the speed of vehicle V1, and maintain an acceptable gap for platooning such as 25 feet. In state 558 the shared world models 240 in each vehicle are updated such that in state 560 V1 and V2 now have a consistent understanding of the world.

In state 562 V2 checks its version of the shared world model 240 to determine if the appropriate pre-conditions are present, that is, whether it is in a state compliant with a request to platoon with V1. For example it may in state 562 check to see if the world model indicates vehicle V1 is an appropriate type of vehicle to lead the platoon and that it is also travelling at an appropriate speed and distance away. At state 564 V2 then issues a request to V1 to join the platoon and the request is received at V1. In state 556 V1 validates the join request against its own version of the shared world model to see if the request is compliant with a "platoon join" request by V2. Such a decision may involve checking to see if V2 is an appropriate type of vehicle to platoon with V1, its systems are functional (such as an operational check of V2's sensors or autonomy logic) or other pre-conditions. If the request is not compliant, in state 566 the request is rejected by V1 and the rejection is communicated to V2 in 567. With a rejected request, each vehicle then concludes the join was not approved and each continues with other operational plans.

However in state 568 if the request is compliant it is approved by V1 and the approval communicated to V2. At this point the shared world models 240 in each vehicle (as before) will eventually be updated so that again each vehicle has an understanding of the world which is consistent with the other vehicles' understanding.

Continuing on to FIG. 5E, in state 570, V2 has entered autonomy mode and the vehicles continue to maintain their respective copies of the shared world model 240. Thus the model will reflect that V2 is in autonomy mode traveling in the center lane at 60 MPH and 10 feet behind V1, and V1 is human driven in the center lane also traveling at 60 MPH and 10 feet ahead of V2.

In state 574 the vehicles continue to update their shared world models 240, detecting perhaps even other vehicles, obstacles, and events around them etc. as explained elsewhere in this document. At this point the human driving V1 eventually decides she wishes to leave and dissolve the platoon. However before doing so she preferably receives approval from V2 (either the human responsible for V2 or the autonomy logic in V2).

In state 576 V2 receives the request from V1 and checks its version of the shared world model 240 to determine if conditions are appropriate to approve such a request. For example, V2 may inquire through a user interface to ask the human responsible for V2 if he is now ready to assume control of vehicle V2. If not then the request may be rejected and that rejection communicated to V1.

However in state 578 the request to dissolve is approved by V2 and communicated back to vehicle V1. In state 580 the human assumes control of vehicle V2—however at this point V2 is still traveling in the center lane and maintains its 60 mile per hour speed. At this point vehicle V1, now being free to leave the platoon, may slightly increase its speed to 62 MPH. The shared world models are updated in state 582. Eventually as shown in FIG. 5C and state 584 of FIG. 5E, the human driving vehicle V2 may decide to enter the left lane and increase its speed to 65 mph. This fact may be noted by V1 as the shared world models are again updated.

2.2. Role Swapping

FIGS. 6A through 6E show another scenario where information is shared between two vehicles operating in a platoon to support collaborative decision making. The situation is one where both vehicles are already moving as a unit, in tandem, but they desire to swap roles and longitudinal lane positions so that the leader becomes the follower and vice versa and the vehicles end up in-line again.

To enable this collaborative role swap behavior, the shared world model 240 may include state information about where each vehicle is located as well as decision information that may be used to decide to commence, maintain, or terminate execution of the role swap maneuver, as well as situational information about the progress each is making toward the next step in the process.

In FIG. 6A, a first vehicle, presently acting as the leader, is denoted by V1 is driven by a human, so it is labelled V1: H, L to indicate that status. A second vehicle, denoted by V2 is presently being substantially controlled by the autonomy logic and is following another vehicle, so its status is indicated as V2: A, F.

At FIG. 6B, assuming that leaving autonomy mode is approved by V1, then V2 switches to human-driven mode and is no longer following or leading, so it is now denoted by V2: H, N. V1's status is also the same, V1: H, N. V2 then executes a lane change into the lane to its left. Once both vehicles are in separate lanes, they modulate their speed so that V2 may overtake V1. In one possible implementation, in order to save fuel, V1 slows down so that V2 does not have to accelerate.

In FIG. 6C, the second vehicle V2 has overtaken V1 and is preparing to execute a lane change into the lane to its right. This maneuver results in V2 moving in front of V1 as shown in FIG. 6D.

In FIG. 6E, the first vehicle, V1, has switched to operating in a substantially autonomous manner and is following V2, V1 is aware that it has become the platoon leader and the collaborative behavior is complete. This is indicated by status V1: A, F and V2: H, L. The result is that both vehicles have switched their relative positions from front to back in the formation and vice-versa, they have switched roles from leader to follower and vice versa, and they have also toggled their modes from human-driven to autonomy and vice-versa, again with collaboration.

Figure 6F:
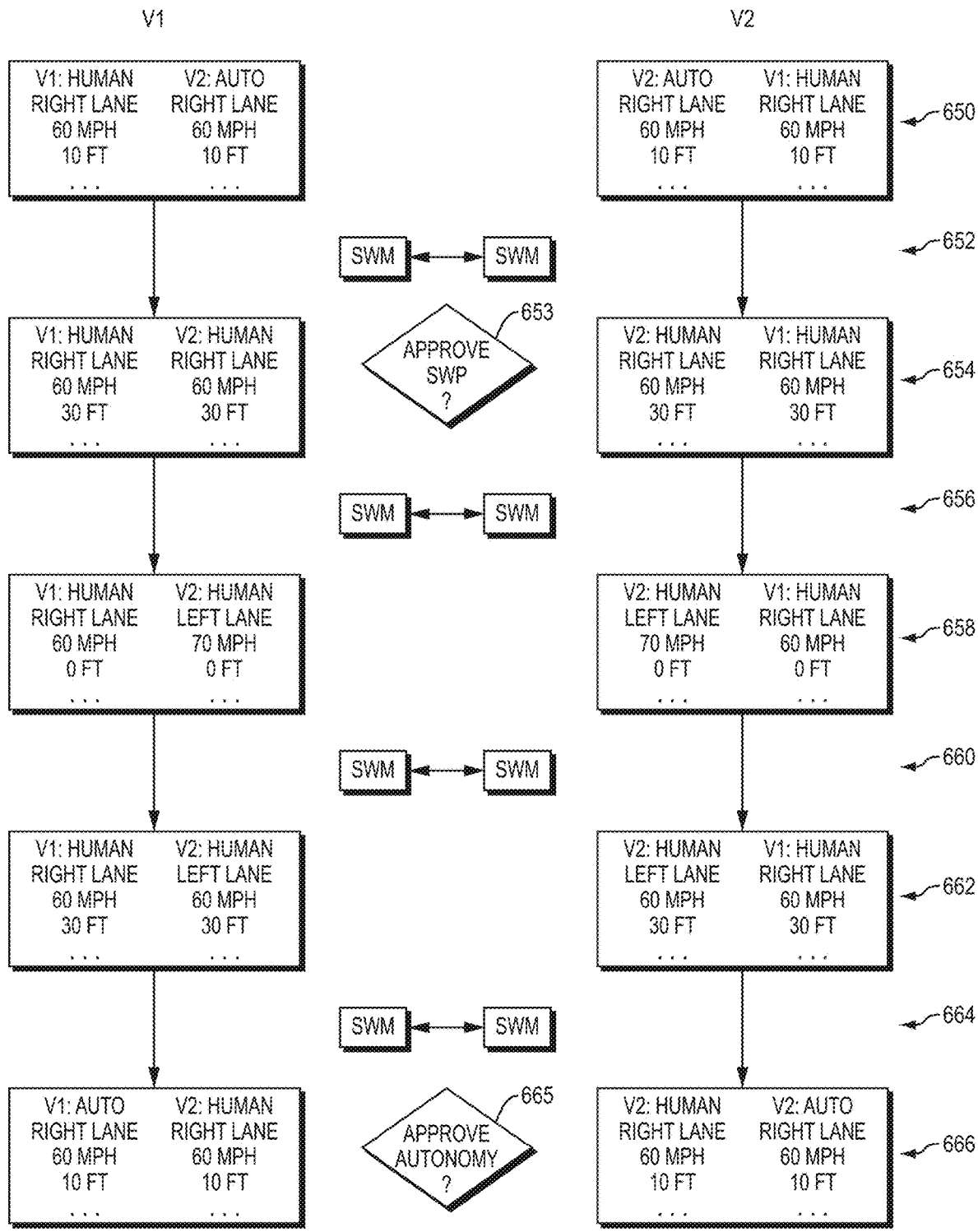
FIG. 6F is a process flow for the scenario of FIGS. 6A through 6E.

FIG. 6F is a logical flow diagram illustrating how the continuously updating shared world model may be used in collaborative decision making for the leader-follower role swapping scenario depicted in FIGS. 6A through 6E.

In this example, in an initial state 650, both vehicles V1 and V2 are operating as a convoy as was indicated in FIG. 6A. Each maintains a world model that is (similar to state 570 in FIG. 5E). Vehicle V1 is maintaining a version of the world model that indicates itself is human driven, located in the right lane and traveling at 60 MPH, while vehicle V2 is operating in an autonomy mode in the same lane, also travelling at 60 mph and following V1. The vehicles are separated by 10 ft.

In this state 650 vehicle V2 also maintains a copy of the world model 240 which is identical to that of vehicle V1 with regard to the information described in the above paragraph in the world model of vehicle V1.

During state 652, both vehicles continuously maintain their respective world models 240, perhaps while exchanging information as needed. Eventually though, a maneuver identical or similar to FIG. 5E is executed, vehicle spacing is increased to 30 ft, and vehicle V2 switches into human driven mode.

At some point one of the vehicles desires to swap the leader/follower roles and sends a request to the other vehicle. The other vehicle then approves or rejects the request in state 653. The process for handling a rejection of the request is not shown in detail here, but may be a sequence of steps analogous to steps 564-560 of FIG. 5D. For example, if either V1 or V2 reject the proposed changing in roles, the vehicles do not swap roles. If however, there is agreement of both V1 and V2 that the role swap may occur, processing continues to state 654 (as depicted in FIG. 6B.)

Because this is a deliberately collaborative behavior, the two vehicles remain in communication, updating their world models in state 656 while the human driver of vehicle V2 changes into the left lane and begins to overtake vehicle V1. The midpoint of this maneuver is shown as state 658 and it corresponds to FIG. 6C.

Eventually, while the world models 240 of both vehicles continue to exchange information (state 660), the human driver of vehicle V2 causes her vehicle to move back into the right lane at an appropriate distance ahead of vehicle V1 and at an appropriate velocity relative to vehicle V1. This is state 662 and it is similar to state 654 except that the vehicles have now reversed stations with vehicle V2 now ahead of vehicle V1. This state 662 corresponds to FIG. 6D. The vehicles continue to update their shared world models in state 664.

Eventually, a sequence similar to that of FIG. 5D is executed and both vehicles and/or their human drivers approve the transition of vehicle V1 into autonomy mode. This may involve another approval process 665 where both vehicles must agree. If so, and assuming that any other preconditions are met and the transition is approved, the two vehicles arrive in state 666 as depicted in FIG. 6F, with V2 being human driven and leading the platoon, and with V1 being an autonomous follower.

2.3. Adaptations to Traffic Situations

Another class of collaborative behaviors are those that are responsive in some way to the surrounding traffic where such traffic is not part of the formation. In this case, information in the shared world model can be used, in part, to make all vehicles more informed on the traffic situation and to coordinate a potentially complicated decision to act or not to act in some manner.

FIG. 7A shows a case where a platoon composed of a leader vehicle L and a follower vehicle F in the process of deciding to move left from their present lane P, to a desired lane D. Both vehicles L and F may influence the decision. At some point in the process of negotiating the decision, one or both vehicles become aware of the presence of a third vehicle M. In this example, in the case where only one vehicle becomes aware of the third vehicle M, the presence of the third vehicle M generates a constraint that is propagated from one vehicle to the other via the shared world model 240. The result is that the action to change lanes is not executed.

The details of the process used to collectively make this decision may be such that each vehicle, based on its sensors, sees none or some or all of the vehicle M and then shares that information (e.g., as a propagated constraint via the shared world model 240) before a final decision is made.

In some implementations, the action to change lanes can be proposed by one vehicle and vetoed by the other. In some implementations, a left lane change may be collaboratively ranked less desirable than a right lane change, and therefore the right lane maneuver is instead proposed, chosen and executed.

In some implementations, a human driver of leader L is involved in the collaborative decision. The lead driver may have indicated an intent to change lanes. The lead driver's intent to change lanes may have been indicated to the system via one of the driver inputs (see FIGS. 1 and 2). This intent to change lanes is shared via the shared world model 240 and eventually propagates to the follower vehicle. The proposed lane change may then be vetoed by the follower F. Or perhaps the follower vehicle's autonomy logic initially intended to move to the left lane for some other valid reason, but was somehow unaware of nearby vehicle M. The maneuver proposed by the autonomy logic may therefore be vetoed by the driver of the lead vehicle.

The motivation to use shared control in this case, in more general terms, is that three intelligent agents (one human and two autonomy logics) may all have a different capacity to see, to understand, and to react in time. A system that orchestrates all three to act as a unit can be superior to alternative solutions.

Figure 7D:
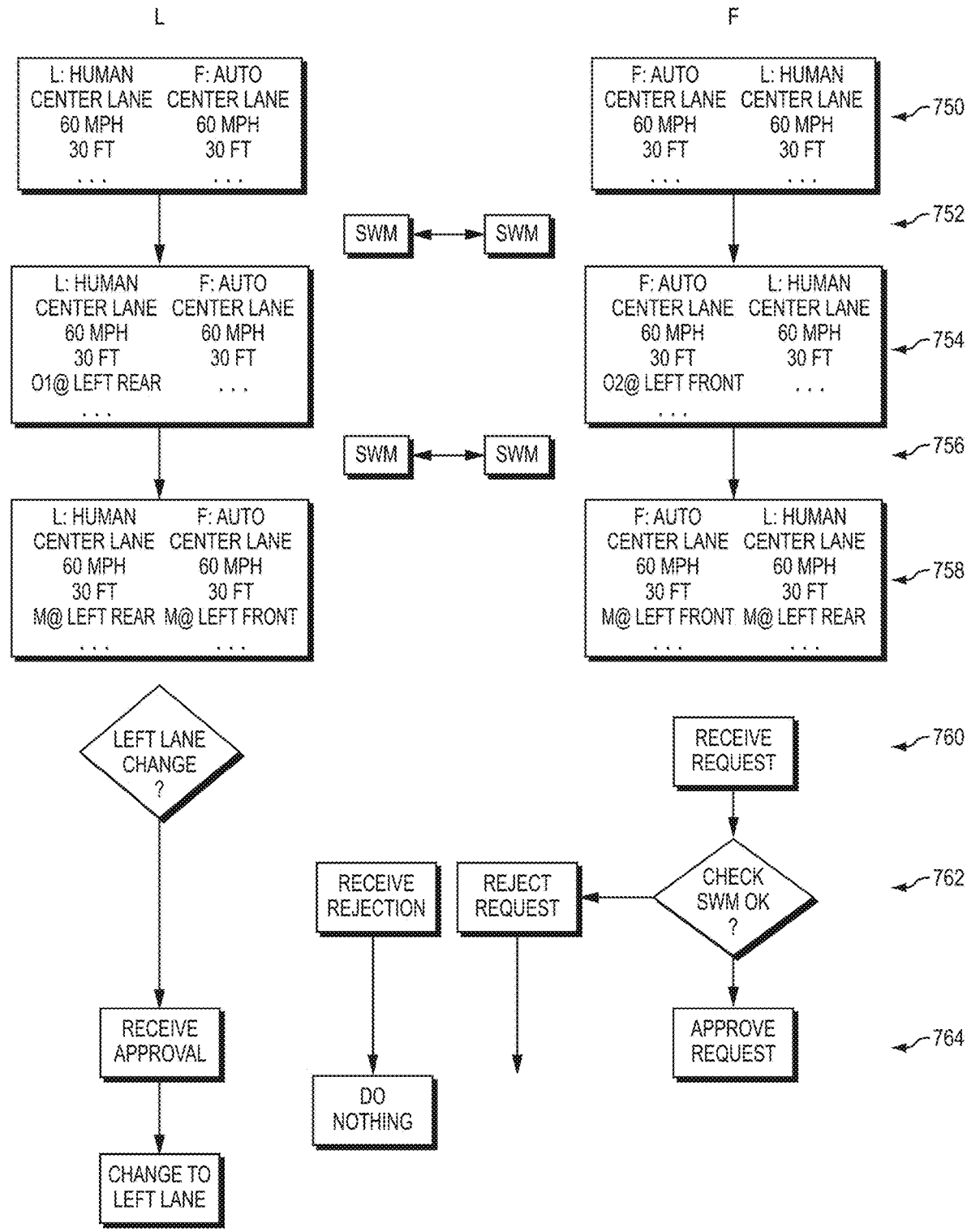
FIG. 7D is a process flow corresponding to the scenarios in FIGS. 7A through 7C.

FIG. 7D is a logical flow diagram illustrating how the continuously updating shared world model 240 may be used in collaborative decision making for the scenario depicted in FIG. 7A. In state 750, the convoy is operating normally with a human driving the leader L and autonomy logic driving follower F. At some point, a human driving vehicle L has decided to move from the center lane to the left lane, and the autonomy logic of leader L sees, based on its sensors, the front of vehicle M while the autonomy logic of follower F sees, based on its sensors, the rear of vehicle M. The blocks in the diagram indicate selected information stored in the respective world models 240 of vehicles L and F.

Continuously, as depicted in state 752, the world models 240 of both vehicles are populated with information about the vehicles and objects in the vicinity of each respective vehicle based on their respective sensors.

At state 754, the autonomy logic of vehicle L has become aware, based on its sensors, of vehicle M, denoted O1, in its left rear quadrant, although it is only able to see the front half of vehicle M. Its own world model 240 reflects this. Likewise, also in state 754, the autonomy logic of vehicle F has become aware, based on its sensors, of vehicle M, denoted O2, in its left front quadrant, although it is only able to see the rear half of vehicle M.

In state 758, after more continuous updates to the shared world models of both vehicles (as in state 756), both models have reached a consensus that O1 and O2 are indeed the same object, and it is now designated consistently as M in both world models.

Subsequently at state 760, the human driver of leader L has indicated a desire to change into the left lane and such indication has caused a request to be sent to follower F to validate the request. In the case where vehicle M remains in the left lane, as depicted in state 762, follower F will reject the requested maneuver, the rejection will be received by leader L, and leader L will prevent or at least discourage its human driver from moving into the left lane. In the case where vehicle M no longer remains in the left lane as depicted in state 764, follower F may accept the requested maneuver, the acceptance will be received by leader L, and leader L autonomy logic will not prevent or discourage its human driver from moving into the left lane. This may be accomplished via displays 118-D (FIGS. 1 and 2).

The request to change lanes in state 760 might be sent via a separate communication channel or a separate message than the one(s) used for shared world model updates. However the handshaking sequence, starting at state 760 of FIG. 7D, could also be accomplished by using shared world model 240 updates to propage the various messages that request, acknowledge, accept, reject proposed behaviors.

The shared world model 240 supports collaborative decision making in still other scenarios. FIG. 7B shows one such case where a platoon composed of a leader L and a follower F becomes aware of a third vehicle X immediately ahead of the leader L which is, for some reason, very close to the leader L. Such a situation represents a heightened risk that the leader L may have to brake or otherwise rapidly reduce speed. That risk further leads to a heightened risk that the follower F could collide with the leader.

In order to mitigate such heightened risks, both vehicles, having detected this situation (with or without the involvement of human drivers), may decide to increase their separation. The precise manner in which separation is reduced, meaning the individual change in speeds of the platoon vehicles L and F, may depend on the speed of the third vehicle X and the need for the leader to maintain its separation from X.

The motivation to use shared control in this case may be that the follower F is unable to see the vehicle X, or it may be a human driver of L is unable to assess the situation correctly or to instruct the follower vehicle in sufficiently quantitative or accurate terms. Or, the motivation may be that the autonomy logic in both vehicles is sufficiently competent that driver(s) in either vehicle can refrain from participation in the decision or the maneuver, and focus their attention elsewhere.

There are several options for what information is exchanged in this case, and for the mechanism by which the decision is collectively made. In one option, the state information related to vehicle X is written by the leader L and read by the follower F and the follower F responds otherwise independently. In another option, the autonomy logic of the leader L computes a new desired separation for the platoon and places it in the world model. In a third option, a human driver in either vehicle becomes aware of vehicle X and initiates the increase-of-separation maneuver.

FIG. 7C shows another case where a platoon composed of a leader L and a follower F becomes aware of a third emergency vehicle S with an activated siren. Vehicle S is immediately behind the follower F and very close to or rapidly closing upon the follower F. In this case, the resulting collaborative decision may be to change lanes from the present lane P into the desired empty right lane D or to the shoulder, to allow the sirened vehicle to pass.

The motivation to use shared control in this case could be that the leader L is unable to see the vehicle S, or it may be a human driver of L is unable to assess the situation correctly or to instruct the follower vehicle in sufficiently quantitative or accurate terms. Or the motivation may be that the autonomy logic in both vehicles is sufficiently competent that driver(s) in either vehicle can refrain from participation in the decision or the maneuver, and focus their attention elsewhere.

There are several options for what information is exchanged in this case, and for the process by which the decision is collectively made. In one option, the state information related to vehicle S is written by the follower F and read by the leader L and the leader L responds otherwise independently with the knowledge that the follower F will intrinsically mimic the lane change of the leader L. In another option, the autonomy logic of the follower F proposes a lane change maneuver for review by all vehicles and engaged human drivers. In a third option, a human driver in either vehicle becomes aware of S and initiates the pull-to-the-side maneuver.

Figure 8:
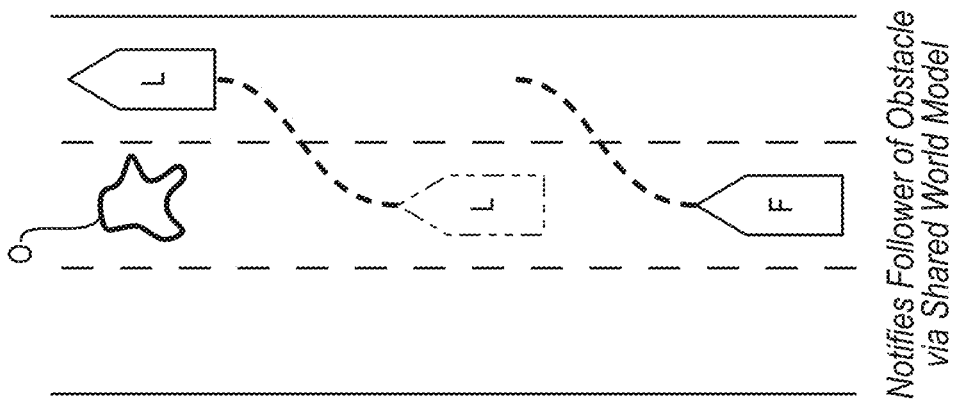
FIG. 8 shows another example of collaboration to react to various traffic situations.

FIG. 8 shows yet another case where a platoon composed of a leader L and a follower F becomes aware of an obstacle O that is blocking the path of the leader L. The follower F may not see the obstacle. This situation is similar to that in FIG. 7B with a few important differences. One difference is that the response of the platoon must be "immediate" here—there is no time to slowly alter separation. Another difference is that what was a "heightened risk" in FIG. 7B is now an "imminent and certain collision" unless something is done to avert it. These differences may lead to a different collaborative decision making process. In one option, the follower F is simply ordered to change lanes to the right. In another option, the decision is (quickly) negotiated but the follower F can only refuse to comply if an equivalent danger of collision exists to its right.

As in the example of FIG. 7B the follower in FIG. 8 may be told of the obstacle in the shared world model but this extra information may not influence the decision much in this case—if the follower is already obliged to stay behind its leader and the leader has already decided to change lanes. There is a special case, however, where the follower is not obliged to stay behind the leader and it may be competent to separate from the leader in response to this situation and, perhaps, change into a lane to its left.

2.4 Other Situations Benefitting from Collaborative Decision Making

It should be understood that shared world model can also be used to improve decision making in other situations. For example, when two vehicles in a platoon wish to engaged in a side by side parking maneuver where sensors on a follower vehicle may not be able to detect obstacles around the lead vehicle. In this instance, the shared world model can be used to ensure that the decision maker in the follower (be it autonomy logic or a human driver) is aware any obstacles to the left or right side of the lead vehicle, before the follower actually attempts to move to park there.

3. Human Interfaces that Enable Humans to Collaborate

Human drivers may at times be more competent than autonomy logic in the control of one or more vehicles, especially in complicated situations, or perhaps in some cases where a human reaction is either faster or more correct than autonomy.

Mechanisms by which a human can share control of his own vehicle are difficult to engineer well due to numerous challenges. One class of challenges is related to the question of what should be done when there are two opinions (human versus automated driver assistance systems (ADAS)) on what action to take.

This problem becomes even more complex when we add more vehicles and/or more humans who have opinions on how a formation of vehicles is to be controlled. Different subproblems related to multiple opinions often require different arbitration mechanisms. In cases like automatic braking, the autonomous components override human behavior. However, there are also cases where humans should have special rights to override default behavior. One such example from above is vetoing a lane change.

Unlike computers, humans can only efficiently process summary information, cannot interact at high speed, are subject to cognitive overload and fatigue, etc. Some of the more effective means of exchanging information with humans include audio signals, displays, speech, sounds, forces, etc. For this reason, the processes described herein are described in terms of "information" (encompassing that which can be provided by or consumed by humans) rather than the narrower term "data" which might otherwise only imply that which can be processed by computers.

Another group of challenges relate to situation awareness. Even between computers connected by high speed wireless communication, it can be a difficult engineering problem to render their world models continuously and consistently, but when humans are also involved, there is an even higher propensity for humans and autonomy to interpret the same situation differently. All of the above problems can be mitigated to some degree based on the use of a shared world model in combination with appropriate displays and input devices.

3.1 Displays that Enable Humans to Collaborate

Figure 9C:
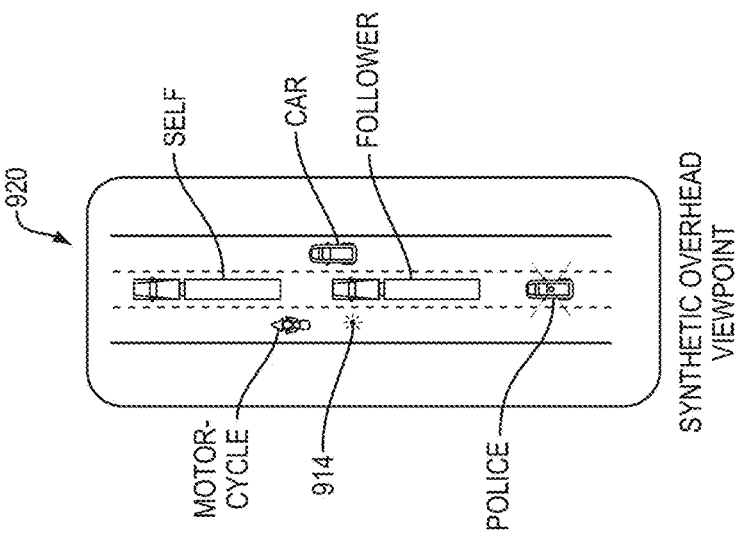
FIGS. 9A to 9E show some examples of operator displays.
Figure 9B:
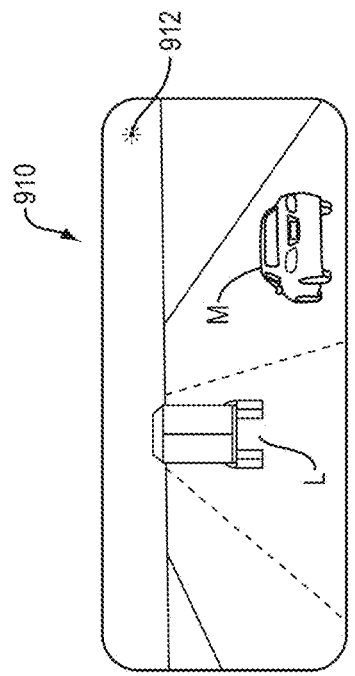
Figure 9A:
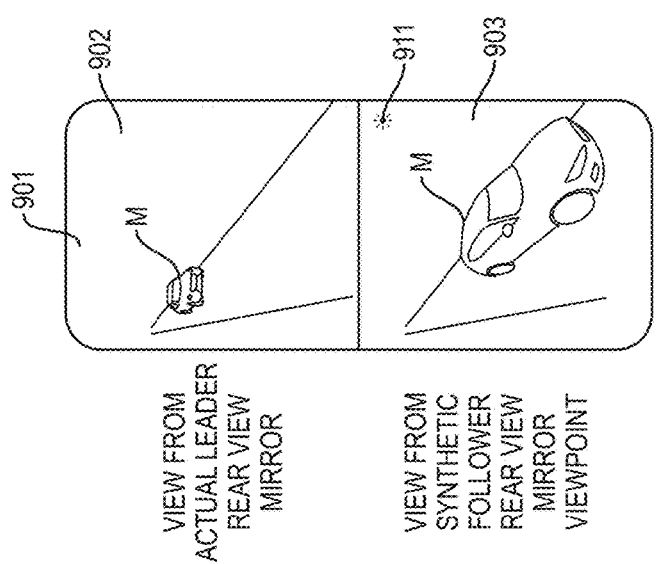

FIGS. 9A through 9C show several examples of human interfaces that are effective for enabling humans to collaborate in the control of a vehicle formation based on a shared world model.

FIG. 9A shows an operator (i.e. human driver) display 901 that is intended to make it easier for a human to drive both his own vehicle and a second vehicle. The display 910 may be generated by software program code running on controller 120 (FIG. 2). The second vehicle may be a follower F that is obliged to follow close behind the human driven leader L. The top view 902 represents the view that may be seen in the driver's side external rear view mirror from the perspective of a driver in the leader vehicle. The bottom view 903 represents the view that may be seen in the driver's side external rear view mirror from the perspective of a driver in the follower vehicle. Note that another vehicle M is visible in both displays 902 and 903.

FIG. 9A shows both of these views being made available to the lead vehicle driver, one over the other, on his driver side mirror. The top half 902 can be an actual optical mirror but the bottom half 903 is a synthetic view generated by controller 120 and application software. The top half could also be a display, instead of a mirror (e.g., the device is entirely a computer-generated display), containing at least the raw or processed image produced by a camera mounted on the mirror housing. The housing may be located exterior or interior to the cab.

The bottom view may be produced by a rendering of information that originated on the follower and was produced by sensors mounted anywhere on the follower, or it may be produced from information originating on the follower that was produced by a camera mounted on the follower's driver-side rear view mirror. In either case, the information needed to produce the display 901 could be made available to the leader vehicle in the shared world model 240.

One advantage of this configuration is that a human driver will be looking at his mirrors anyway and it may be intuitive to enable such a display which imagines sitting in the second vehicle while assessing the associated synthetic view 903. The situation depicted is a vehicle to the left of a follower vehicle and it is displayed in both views. The follower view is better suited to judging whether it is safe for the follower to change lanes but the display makes it possible for the leader vehicle driver to make the assessment.

FIG. 9B shows an operator display that is a synthetic view 910 of the windshield view of a second vehicle, from the perspective of the driver's seat of the second vehicle. It may appear on the dash of a driver's own vehicle, or in a heads-up display, or in another convenient place that is visible to the human driver. Once again the display 910 may be rendered from information originating anywhere on a second vehicle, from the shared world model 240, or it may be produced from a camera on the second vehicle that is positioned and oriented near the desired viewpoint and fed to the first vehicle.

One advantage of this configuration is that a human driver will be accustomed to assessing traffic from such a perspective and it may be intuitive to momentarily imagine sitting in the second vehicle while assessing the associated synthetic view 910. The situation depicted is a vehicle to the right of a follower vehicle and the synthetic view also includes the view of the rear of the leader vehicle. The follower view is better suited to judging the risk of the third vehicle M cutting in between the convoy but the display makes it possible for the leader vehicle driver to make the assessment. This view 910 can also be very valuable to allow a human in the leader vehicle to teleoperate the follower vehicle in any situation where such a capability may be useful. Just one example situation is one where the follower vehicle autonomic logic declares its own failure and the human in the leader wishes to drive it onto the shoulder.

FIG. 9C shows another synthetic "overhead" view 920 that could allow a human driver anywhere in a formation to efficiently and intuitively take in an overall representation of spatial relationships and relative velocities. Such a display could appear in any convenient location within the view of a human driver of any vehicle and it could be rendered based on the contents of the shared world model in the driver's own vehicle.

The situation depicted in FIG. 9C is a combination of many of those described above. There is a sirened vehicle close behind the follower, a car to the right of the follower, and a motorcycle to the left of and ahead of the follower. A driver in the lead vehicle could benefit from this convenient, visual, overhead summary representation of the situation. It may be presented on an in-dash display of the human driven vehicle, or their personal smartphone or tablet, or in other ways.

Feedback to the human driver, such as to provide for acknowledgement of requests for collaborative maneuvers made by human driver to the autonomy logic can be provided via the displays of FIGS. 9A to 9C.

For example, the synthetic mirror display of FIG. 9A can include a visual indicator, such as a portion 911 of the screen having pixels colored green or red, to indicate agreement to or rejection of a collaborative decision. Yellow might indicate a request is still being processed. The portion 911 may also be provided in other ways such as with a discrete LED mounted on or near the display 901.

For example, a green light portion 911 may consent of the autonomy logic in a follower vehicle to a lane change maneuver proposed by a human driver of a lead vehicle. A red light may indicate the proposed lane change was rejected by the autonomy logic. Red or yellow may indicate the autonomy logic is still processing the request.

Similarly, the synthetic follower viewpoint of FIG. 9B can be augmented with a green/red indicator light portion 912.

In another example, the overhead view of FIG. 9C can also have a green/red indicator area 914 or other indicia to confirm the status of a request for a collaborative decision.

Figure 9D:
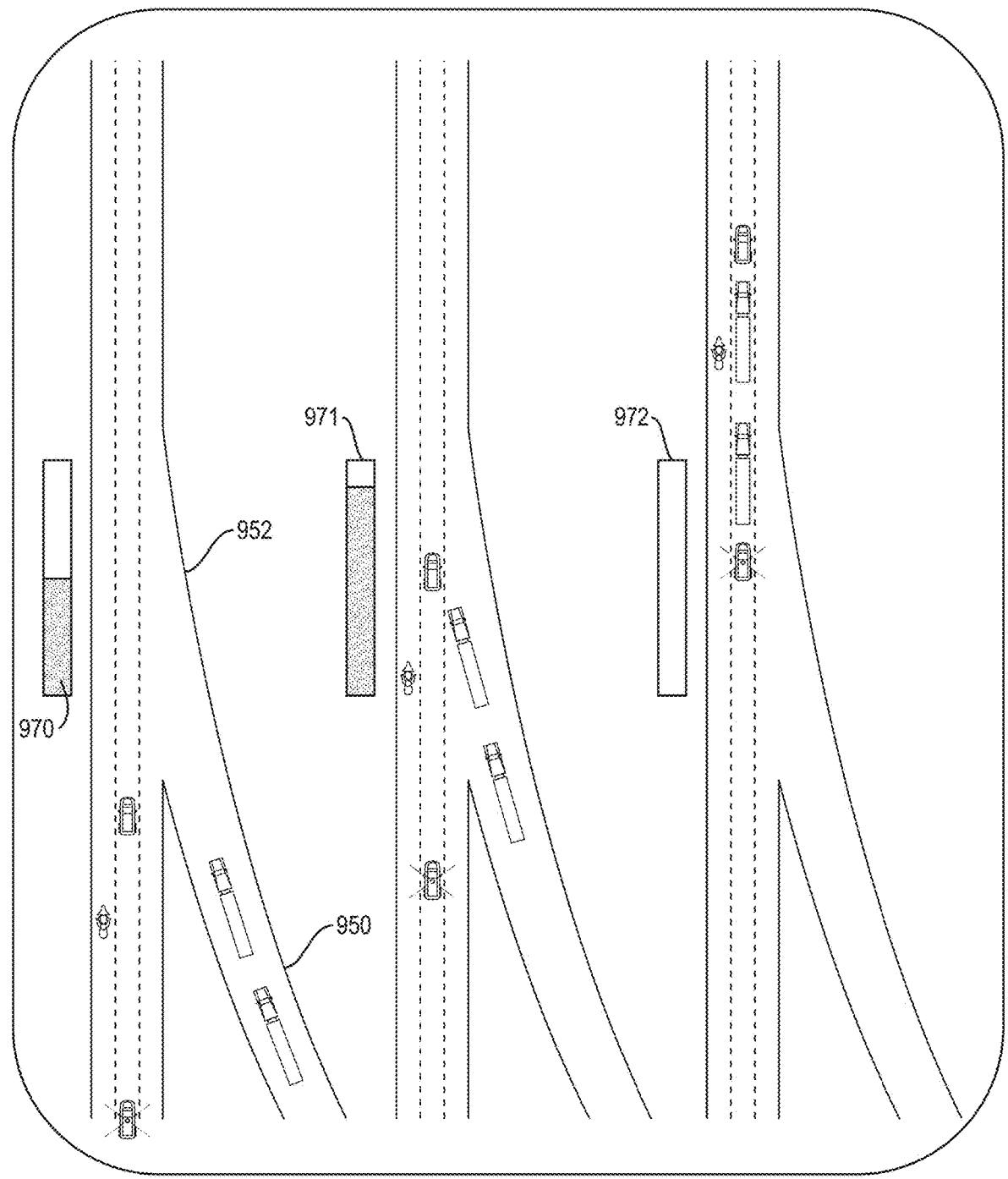

FIG. 9D shows another situation where another type of overhead display may be useful. In this case, a platoon 950 is travelling on an on-ramp 952 and it is progressing toward an imminent merge with traffic in the closest lane of the next highway. A human driver needs to assess the existence and predicted position of at least one gap in the parallel traffic in the to-be-merged-with lane. If more than one gap exists, he may have to choose one to target. Then he must adjust speed to arrive in the same place as that gap at the same time. This is difficult to do for a driver of a single vehicle when the gap needed is slightly larger than the single vehicle. It is much more difficult to do for a driver of a convoy lead vehicle when the gap is as large as two vehicles including the separation between them.

In such difficult cases, a shared world model can assist humans by supplying the data needed for useful displays. Sensors on all vehicles in the platoon can update a shared world model to give a human driver a clearer sense of the relative position and speed of traffic to be merged with.

FIG. 9D shows an example where the present situation is displayed on the leftmost part of the display. The shared world model may also provide data that enables predictive views of the future on any display, but such a view would have particular value in this case. The middle and rightmost parts of FIG. 9D show two predicted situations a few tens of seconds in the future. In one alternative, all traffic is simply advanced in time based on the present speed of each vehicle as determined by the sensors of autonomy logic and the consensus of the shared world models. In addition to such displays, audio tones or other sounds could be used to cue the driver to increase or decrease speed in order to better synchronize with the intended gap.

Figure 9E:
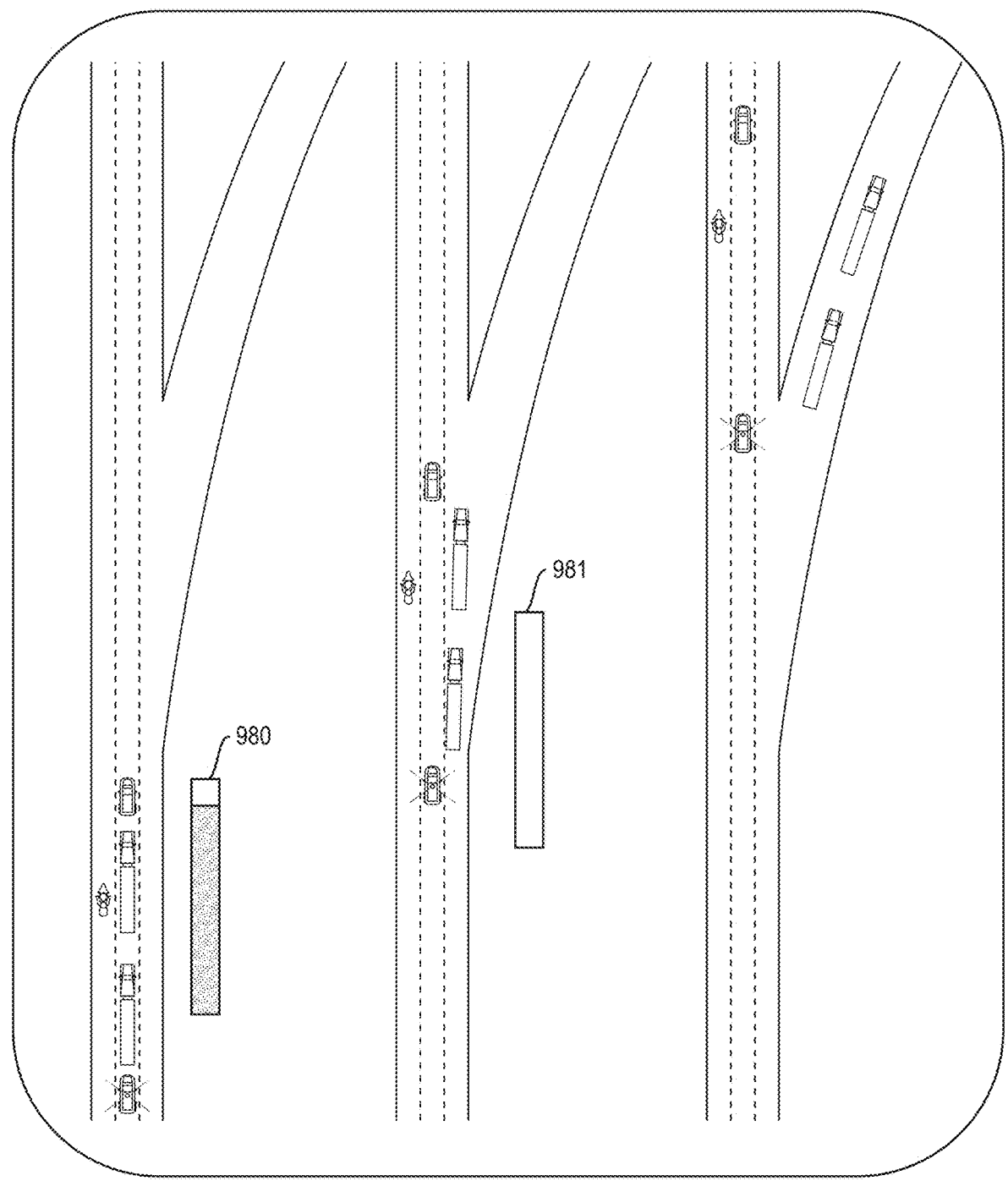

FIG. 9E shows the complementary case to an on-ramp. Here, the convoy intends to take the next off-ramp, which happens to be a right exit. In this case, the present situation is once again shown on the left and two predicted displays are shown in parts to its right. The potential advantages of this display include assisting humans to assess the remaining distance to the off-ramp and to assess whether any other traffic is also moving in a manner that indicates an intention to exist as well.

The displays of FIGS. 9D and 9E can be embellished with additional graphics derived from the shared world model that represent a time or distance remaining to safely execute a maneuver, such as merging onto a highway or changing lanes. The human driver can then use these graphics to help gauge her speed accordingly.

One such example are the progress bars 970, 971 and 972 of FIG. 9D. Information regarding the position and speed of nearby vehicles and/or obstacles stored in the Shared World Model 240 (as already described above) can be used to determine an estimate of the time before other traffic closes in. The progress bar 970 in the initial left most view is partially shaded, with the unshaded portion indicated an estimated time or distance remaining for the platoon to merge from the on ramp onto the highway. Subsequently, a state is reached with the middle view and the progress bar in state 971 indicating that the time to merge is almost over. Finally, a state 972 is reached for the progress bar, where the on ramp merge is complete and thus the progress bar is empty.

Progress bars such as 980 and 981 may be added to the display of FIG. 9E to indicate a time or distance remaining to safely complete a lane change maneuver.

In some embodiments, the same information conveyed by the unshaded portion may be conveyed using an audio signal such as a tone of changing frequency content or synthetic speech.

3.2 Output Devices that Enable Humans to Collaborate

In addition to the visual output devices described above, it can also be effective to interact with humans using sounds, speech, and forces. Such information can be intuitive to process and it may reduce cognitive overload. Sounds and speech can be an effective means to communicate a dissenting opinion, the occurrence of important events, or some other useful information. Likewise, in a process known as force feedback, autonomy logic might communicate with a driver by the application of forces whose purpose is being sensed by a human in the above situations or others.

Figure 10B:
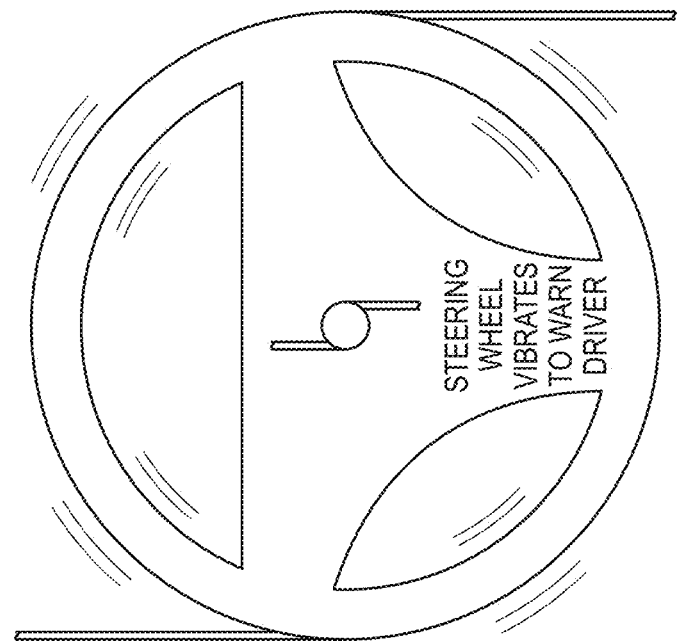
FIGS. 10A, 10B, and 10C show some examples of haptic interaction with a human driver.
Figure 10A:
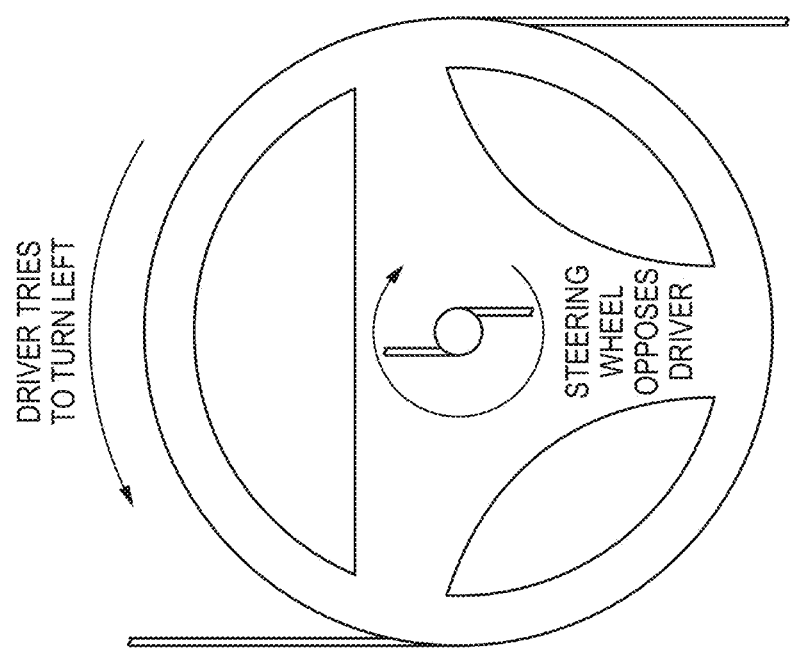

FIG. 10A shows an example of a dissenting opinion originating somewhere in the formation being communicated to a human driver. The example situation is one where a human driver is beginning to steer left to move into the left lane but the autonomy logic on his or another vehicle wants to discourage or prevent the maneuver. The driver is already holding a steering wheel so it can be convenient to communicate with the human driver by applying opposing torques to discourage or prevent the steering wheel from turning. In such a case it may be useful to augment this force signal with a particular buzzer sound for this situation or to play a speech signal that says, for example, "Left lane is blocked".

FIG. 10B shows an example of communicating an event to a human driver. The general situation is that something important that requires immediate attention has happened, and a description of the event has appeared in the shared world model. In addition to any audio or speech signals that may be produced, the steering wheel (or some other input device such as a joystick) is vibrated as well. Specific examples where this technique could be useful include cases where the driver appears to be losing attentiveness, or a deer has appeared on the road, or the driver's vehicle is approaching the rumble strip on the shoulder.

Figure 10C:
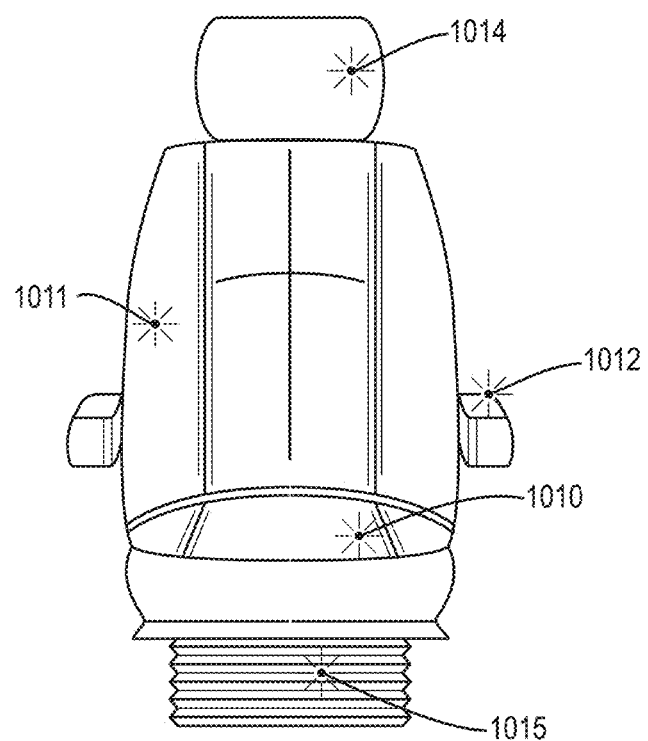

Haptic type feedback can also be provided in other ways to communicate a dissenting opinion, the occurrence of some event, or other items of information. FIG. 10C shows one example, where motors or other haptic actuators may be placed in the driver seat, such as in the base cushions 1010, side bolsters 1011, armrests 1012, head rests 1014, or lower support 1015.

For example, if the controller 120 has determined from the shared world model 240 that a vehicle is approaching on the left side of the convoy, the controller may only activate actuators on the left side of the seat (such as 1010 and/or 1012 and/or 1014) with other actuators 1011 and/1015 remaining inactive.

If actuators are dispersed about or around the seat, the relative position of the actuator may provide further feedback to the driver. Multiple haptic actuators may therefore be embedded on each side, to the front and rear of the base cushion. In this example, a haptic actuator located towards the rear left of the seat base may indicate an vehicle approaching from behind and to the left of the platoon, and an actuator located towards the front right of the seat base may indicate an obstacle to the right in the forward path of the platoon.

4. Implementation Options

The foregoing description of example embodiments illustrates and describes systems and methods for implementing novel arrangement and operation of sensors in a vehicle. However, it is not intended to be exhaustive or limited to the precise form disclosed.

The embodiments described above may be implemented in many different ways. In some instances, the various "computers" and/or "controllers" are "data processors" or "embedded systems" that may be implemented by a one or more physical or virtual general purpose computers having a central processor, memory, disk or other mass storage, communication interface(s), input/output (I/O) device(s), and other peripherals. The general purpose computer is transformed into the processors with improved functionality, and executes program code to perform the processes described above to provide improved operations. The processors may operate, for example, by loading software instructions, and then executing the instructions to carry out the functions described.

As is known in the art, such a computer may contain a system bus, where a bus is a set of hardware wired connections used for data transfer among the components of a computer or processing system. The bus or busses are shared conduit(s) that connect different elements of the computer system (e.g., processor, disk storage, memory, input/output ports, network ports, etc.) to enables the transfer of information. One or more central processor units are attached to the system bus and provide for the execution of computer instructions. Also attached to system bus are typically I/O device interfaces for connecting various input and output devices (e.g., sensors, lidars, cameras, keyboards, touch displays, speakers, wireless radios etc.) to the computer. Network interface(s) allow the computer to connect to various other devices or systems attached to a network. Memory provides volatile storage for computer software instructions and data used to implement an embodiment. Disk or other mass storage provides non-volatile storage for computer software instructions and data used to implement, for example, the various procedures described herein.

Certain portions may also be implemented as "logic" that performs one or more of the stated functions. This logic may include hardware, such as hardwired logic circuits, an application-specific integrated circuit, a field programmable gate array, a microprocessor, software, firmware, or a combination thereof. Some or all of the logic may be stored in one or more tangible non-transitory computer-readable storage media and may include computer-executable instructions that may be executed by a computer or data processing system. The computer-executable instructions may include instructions that implement one or more embodiments described herein. The tangible non-transitory computer-readable storage media may be volatile or non-volatile and may include, for example, flash memories, dynamic memories, removable disks, and non-removable disks.

Embodiments may therefore typically be implemented in hardware, firmware, software, or any combination thereof.

In some implementations, the computers or controllers that execute the processes described above may be deployed in whole or in part in a cloud computing arrangement that makes available one or more physical and/or virtual data processing machines via on-demand access to a network of shared configurable computing resources (e.g., networks, servers, storage, applications, and services) that can be rapidly provisioned and released with minimal management effort or service provider interaction.

Furthermore, firmware, software, routines, or instructions may be described herein as performing certain actions and/or functions. It also should be understood that the block and flow diagrams may include more or fewer elements, be arranged differently, or be represented differently. Therefore, it will be appreciated that such descriptions contained herein are merely for convenience and that such actions in fact result from computing devices, processors, controllers, or other devices executing the firmware, software, routines, instructions, etc.

While a series of steps has been described above with respect to the flow diagrams, the order of the steps may be modified in other implementations. In addition, the steps, operations, and steps may be performed by additional or other modules or entities, which may be combined or separated to form other modules or entities. For example, while a series of steps has been described with regard to certain figures, the order of the steps may be modified in other implementations consistent with the principles of the invention. Further, non-dependent steps may be performed in parallel. Further, disclosed implementations may not be limited to any specific combination of hardware.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The above description contains several example embodiments. It should be understood that while a particular feature may have been disclosed above with respect to only one of several embodiments, that particular feature may be combined with one or more other features of the other embodiments as may be desired and advantageous for any given or particular application. It is, of course, not possible to describe every conceivable combination of components or methodologies for purposes of describing the innovations herein, and one skill in the art may now, in light of the above description, recognize that many further combinations and permutations are possible. Also, to the extent that the terms "includes," and "including" and variants thereof are used in either the detailed description or the claims, these terms are intended to be inclusive in a manner similar to the term "comprising".

Accordingly, the subject matter covered by this patent is intended to embrace all such alterations, modifications, equivalents, and variations that fall within the spirit and scope of the claims that follow.

The invention claimed is:

1. A system for generating a plurality of synthetic viewpoints, the system comprising one or more processors configured to execute computer executable program code stored in one or more memories that, when executed causes the system to:
   receive first information associated with one or more human driver inputs detected at one or more input devices and one or more outputs generated by one or more output devices on a first vehicle, wherein the first vehicle is at least partially controllable by a human driver;
   receive second information associated with a plurality of sensors on both the first vehicle and a second vehicle, wherein the second vehicle is at least partially controllable by autonomy logic;
   share the first information and the second information between the first and second vehicles as shared information;
   maintain, using the shared information, a respective local copy of a shared world model at the first vehicle;
   generate, by the first vehicle, based on the shared information included in its respective local copy of the shared world model, a plurality of synthetic viewpoints, wherein the plurality of synthetic viewpoints comprises a viewpoint from the second vehicle and an overhead viewpoint, the overhead viewpoint depicting both the first and the second vehicle, wherein the overhead viewpoint depicting both the first and the second vehicle is rendered based at least in part on sensor data from both the first and the second vehicle included in the local copy of the shared world model of the first vehicle;
   cause display of at least one of the plurality of generated synthetic viewpoints on a display included in the first vehicle; and
   wherein the computer executable program code, when executed, further causes the system to: display on the display associated with the first vehicle, a status of the first vehicle and the second vehicle collaboratively engaging in a decision.

2. The system of claim 1, wherein the one or more input devices comprise any of a steering wheel, a throttle, a joystick, and a touch screen.

3. The system of claim 1, wherein the display is disposed within an external mirror of the first vehicle.

4. The system of claim 1, wherein the display is disposed within the first vehicle.

5. The system of claim 1, wherein the information associated with one or more human driver inputs detected at one or more input devices includes data indicative of physical phenomena created by human drivers.

6. The system of claim 1, wherein the one or more outputs generated by one or more output devices on the first vehicle include data associated with physical phenomena capable of being sensed by human drivers.

7. The system of claim 1, wherein the information associated with the plurality of sensors on both the first vehicle and the second vehicle includes unprocessed information received from the plurality of sensors or one or more input devices.

8. The system of claim 1, wherein the computer executable program code, when executed, further causes the system to: process any of the first information and the second information to generate derived information.

9. The system of claim 8, wherein the derived information comprises any of fused data, predicted data, event data, constraint data, decision making data, notification data, and action data.

10. The system of claim 8, wherein the computer executable program code, when executed, further causes the system to: share the derived information between the first and the second vehicles as part of the shared information.

11. The system of claim 1, wherein the computer executable program code, when executed, further causes the system to: generate at least one of an audio output and a haptic output.

12. The system of claim 11, wherein the haptic output is provided through any of a steering wheel, a joystick, and a driver seat.

13. The system of claim 1, wherein the computer executable program code, when executed, further causes the system to: generate, based on the shared information, one or more predictive viewpoints; and display the one or more predictive viewpoints on the display associated with the first vehicle.

14. The system of claim 1, wherein the computer executable program code, when executed, further causes the system to: display on the display associated with the first vehicle, a progress bar indicating at least one of a remaining time and a remaining distance for the vehicles to safely complete a maneuver.

* * * * *